(12) United States Patent
Furui et al.

(10) Patent No.: US 11,656,124 B1
(45) Date of Patent: May 23, 2023

(54) SENSING DEVICE

(71) Applicant: InnoLux Corporation, Miao-Li County (TW)

(72) Inventors: Yuko Furui, Miao-Li County (TW); Akihiro Iwatsu, Miao-Li County (TW); Shuji Hagino, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 17/584,824

(22) Filed: Jan. 26, 2022

(51) Int. Cl.
*G01J 1/44* (2006.01)

(52) U.S. Cl.
CPC ........... *G01J 1/44* (2013.01); *G01J 2001/446* (2013.01)

(58) Field of Classification Search
CPC combination set(s) only.
See application file for complete search history.

(56) References Cited

U.S. PATENT DOCUMENTS

| | | | |
|---|---|---|---|
| 6,222,175 B1* | 4/2001 | Krymski | H04N 5/361 348/E5.079 |
| 2006/0119719 A1* | 6/2006 | Kameshima | H04N 5/378 348/308 |
| 2007/0200833 A1 | 8/2007 | Park et al. | |
| 2009/0321615 A1* | 12/2009 | Sugiyama | H04N 5/2351 250/208.1 |
| 2010/0295979 A1* | 11/2010 | Taka | H04N 5/361 348/300 |
| 2015/0084923 A1 | 3/2015 | Kang | |
| 2017/0108993 A1 | 4/2017 | Lee et al. | |

* cited by examiner

*Primary Examiner* — Tony Ko
(74) *Attorney, Agent, or Firm* — McClure, Qualey & Rodack, LLP

(57) ABSTRACT

A sensing device provided herein includes a first pixel circuit, a readout circuit, a first switch, a second switch, and a first capacitor. The readout circuit is electrically connected to the first pixel circuit. The first switch is electrically connected between the first pixel circuit and the readout circuit. The second switch is electrically connected between the first switch and the readout circuit. The first capacitor includes a first electrode electrically connected to the first switch and the second switch.

17 Claims, 21 Drawing Sheets

400

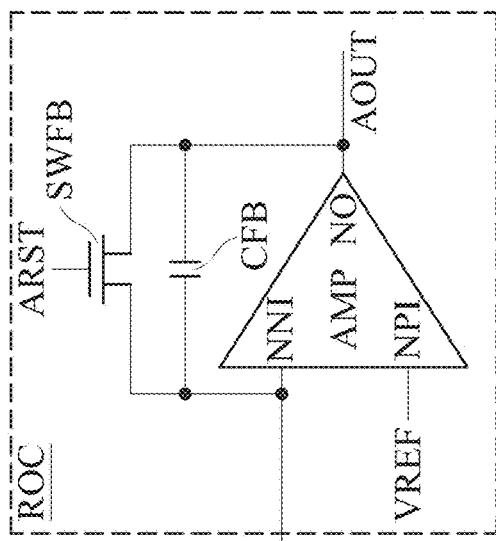
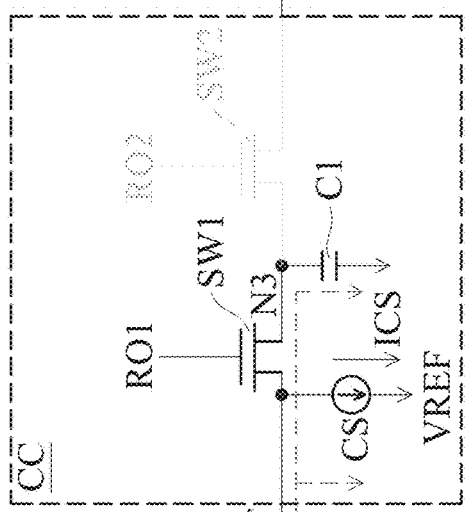
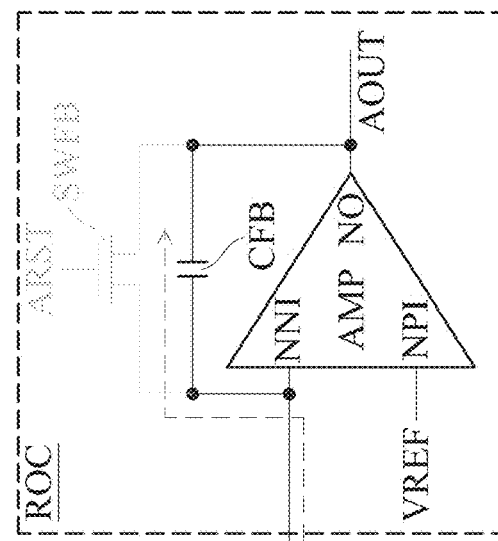
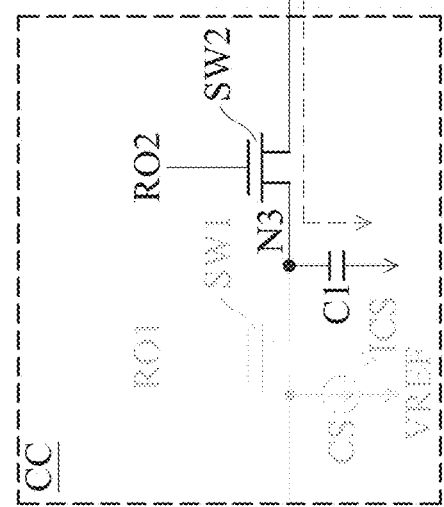
FIG. 6B
FIG. 6C

SENSING DEVICE

BACKGROUND OF THE INVENTION

Field of the Invention

The disclosure is generally related to a sensing device, and more particularly it is related to a sensing device having an additional capacitor electrically connected to a data line for controlling the gain of the readout circuit.

Description of the Related Art

Currently, image sensors including active pixel sensors are widely used in electronic devices. In an image sensor, a plurality of pixel circuits are electrically connected to a corresponding readout circuit through a corresponding data line, and the data from each pixel circuit is read by the readout circuit. Generally, the readout circuit includes an amplifier. The gain of the amplifier is determined by the ratio of the data capacitor to the capacitance across the output node and the negative input node of the amplifier. Since the data capacitor should be increased in large-sized and high resolution applications, the output signal generated by the amplifier may exceed the linear operation range.

BRIEF SUMMARY OF THE INVENTION

In an embodiment, a sensing device is provided herein. The sensing device comprises a first pixel circuit, a readout circuit, a first switch, a second switch, and a first capacitor. The readout circuit is electrically connected to the first pixel circuit. The first switch is electrically connected between the first pixel circuit and the readout circuit. The second switch is electrically connected between the first switch and the readout circuit. The first capacitor comprises a first electrode, which is electrically connected to the first switch and the second switch.

A detailed description is given in the following embodiments with reference to the accompanying drawings.

BRIEF DESCRIPTION OF DRAWINGS

The disclosure can be more fully understood by reading the subsequent detailed description and examples with references made to the accompanying drawings, wherein:

FIGS. 6A-6C illustrate operations of the sensing device in FIG. 4 in accordance with another embodiment of the disclosure;

DETAILED DESCRIPTION OF THE INVENTION

Figure 1:
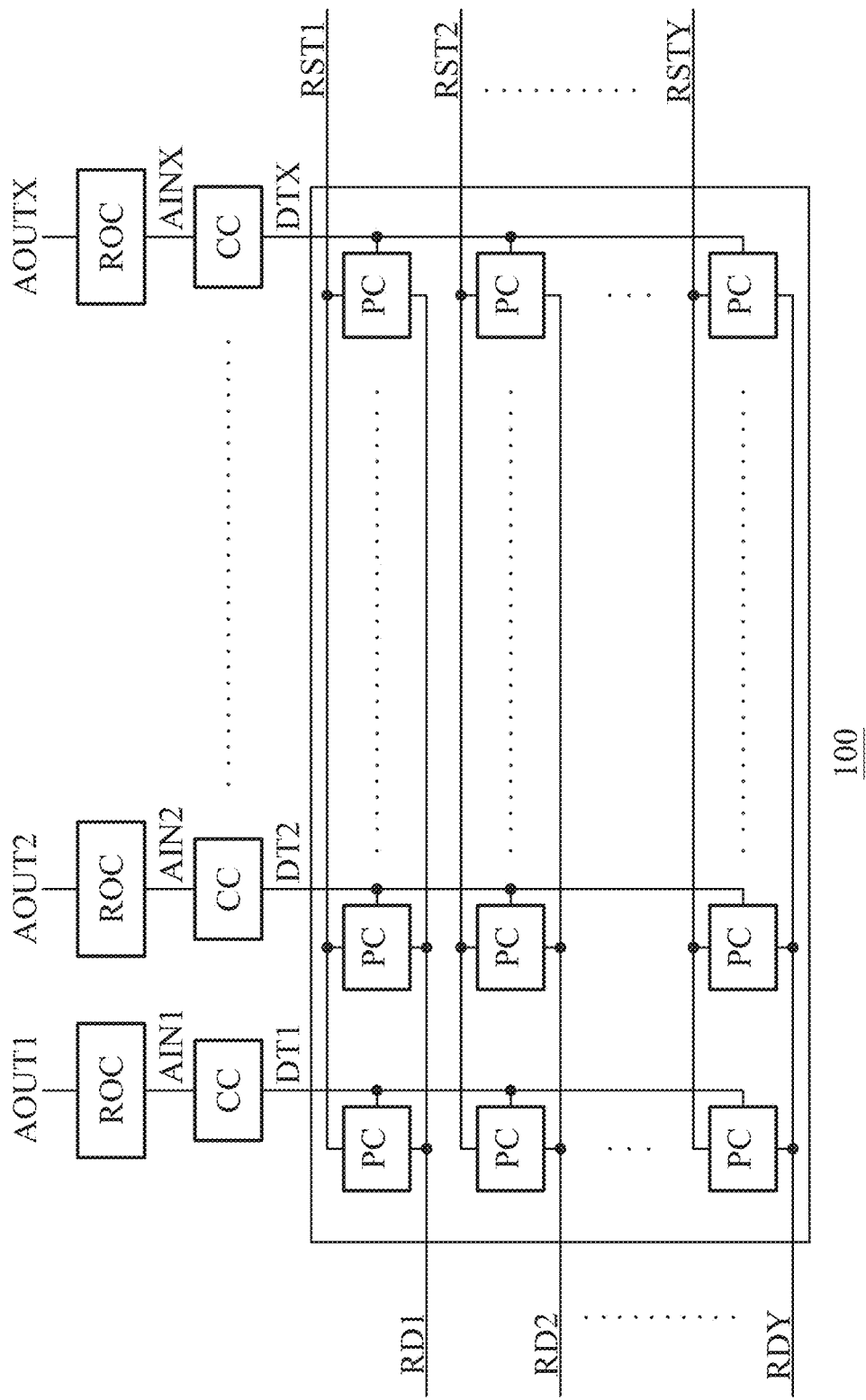
FIG. 1 is a schematic diagram of a pixel array in accordance with an embodiment of the disclosure.

The following description is made for the purpose of illustrating the general principles of the disclosure and should not be taken in a limiting sense. The scope of the disclosure is determined by reference to the appended claims.

In the following detailed description, for purposes of explanation, numerous specific details and embodiments are set forth in order to provide a thorough understanding of the present disclosure. The use of like and/or corresponding numerals in the drawings of different embodiments does not suggest any correlation between different embodiments.

In addition, in this specification, relative spatial expressions are used. For example, "lower", "bottom", "higher" or "top" are used to describe the position of one element relative to another. It should be appreciated that if a device is flipped upside down, an element that is "lower" will become an element that is "higher".

It should be understood that, although the terms first, second, third etc. may be used herein to describe various elements, components, regions, layers, portions and/or sections, these elements, components, regions, layers, portions and/or sections should not be limited by these terms. These terms are only used to distinguish one element, component, region, layer, portion or section from another element, component, region, layer or section. Thus, a first element, component, region, layer, portion or section in the specification could be termed a second element, component, region, layer, portion or section in the claims without departing from the teachings of the present disclosure.

It should be understood that this description of the exemplary embodiments is intended to be read in connection with the accompanying drawings, which are to be considered part of the entire written description. The drawings are not drawn to scale. In addition, structures and devices are shown schematically in order to simplify the drawing.

The terms "approximately", "about" and "substantially" typically mean a value is within a range of +/−20% of the stated value, more typically a range of +/−10%, +/−5%, +/−3%, +/−2%, +/−1% or +/−0.5% of the stated value. The stated value of the present disclosure is an approximate value. Even there is no specific description, the stated value still includes the meaning of "approximately", "about" or "substantially".

Unless defined otherwise, all technical and scientific terms used herein have the same meaning as commonly understood by one of ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined.

In addition, in some embodiments of the present disclosure, terms concerning attachments, coupling and the like, such as "connected" and "interconnected," refer to a relationship wherein structures are secured or attached to one another either directly or indirectly (for example, electrically connection) via intervening structures, as well as both movable or rigid attachments or relationships, unless expressly described otherwise.

FIG. 1 is a schematic diagram of a pixel array in accordance with an embodiment of the disclosure. As shown in FIG. 1, the pixel array 100 includes a plurality of pixel circuits PC, a plurality of column circuits CC, and a plurality of readout circuits ROC. Each of the pixel circuits PC is selected by a corresponding one of the select signals RD1, RD2, . . . , RDY and reset by a corresponding one of the reset signals RST1, RST2, RSTY.

A readout circuit is electrically connected to at least one pixel circuit. To be more specific, each of the data lines DT1, DT2, DTX electrically connects a corresponding one of the column circuits CC and a corresponding column of pixel circuits PC. Each of the readout circuits ROC reads the corresponding one of the read signals AIN1, AIN2, AINX through its corresponding one of the wires between the readout circuits ROC and column circuits CC to generate the corresponding one of the output signals AOUT1, AOUT2, AOUTX.

Figure 2:
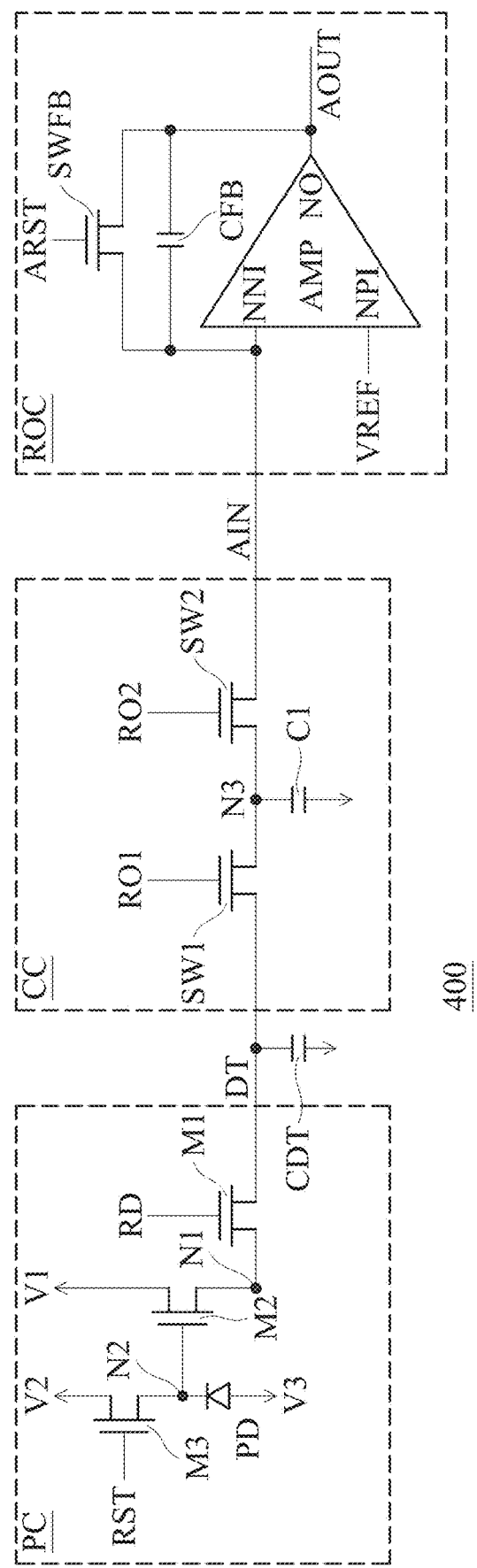
FIG. 2 is a schematic diagram of a sensing device in accordance with another embodiment of the disclosure.

FIG. 2 is a schematic diagram of a sensing device in accordance with an embodiment of the disclosure. As shown in FIG. 2, the sensing device 200 exemplarily illustrates one of the pixel circuits PC, one of the column circuits CC, and one of the readout circuits ROC in FIG. 1. The pixel circuit PC includes a first transistor M1, a second transistor M2, a third transistor M3, and a photodiode PD, but the disclosure is not limited thereto.

The first transistor M1 includes a first terminal electrically connected to the first node N1, a second terminal electrically connected to the data line DT, and a control terminal receiving a select signal RD. The second transistor M2 includes a first terminal receiving a first voltage V1, a second terminal electrically connected to the first node N1, and a control terminal electrically connected to a second node N2. The third transistor M3 includes a first terminal receiving a second voltage V2, a second terminal electrically connected the second node N2, and a control terminal receiving a reset signal RST. The photodiode PD includes an anode NA and a cathode NC, in which the anode NA is electrically connected to a third voltage V3 and the cathode NC is electrically connected to the second node N2.

The column circuit CC includes a first switch SW1, a second switch SW2, and a first capacitor C1. The first switch SW1 is electrically connected between the pixel circuit PC and the readout circuit, and controlled by a first readout signal RO1. The second switch SW2 is electrically connected between the first switch SW1 and the negative input node NNI and controlled by a second readout signal RO2. A node N3 is electrically connected between the first switch SW1 and the second switch SW2, The first capacitor C1 is electrically connected between the third node N3 and a ground, and a first electrode of the first capacitor C1 is electrically connected to the first switch SW1 and the second switch SW2, According to an embodiment of the disclosure, the data capacitor CDT is the parasitic capacitor at the data line DT. The readout circuit ROC includes an amplifier AMP, a feedback capacitor CFB, and a feedback switch SWFB.

The amplifier AMP includes a negative input node NNI, a positive input node NPI, and an output node NO, in which the negative input node NNI is electrically connected to the second switch and receives the read signal AIN, the positive input node NPI receives the reference voltage VREF, and the output node NO generates the output signal AOUT. The feedback capacitor CFB is electrically connected between the negative input node NNI and the output node NO. The feedback switch SWFB is electrically connected between the negative input node NNI and the output node NO and controlled by an amp-reset signal ARST.

According to an embodiment of the disclosure, when the third transistor M3 is turned on by the reset signal RST, the third transistor M3 provides the second voltage V2 to the second node N2 and the third transistor M3 is then turned off. After the photodiode PD senses the light to change the voltage of the second node N2, the first transistor M1 is turned on by the select signal RD, and a current flowing through the second transistor M2 and the first transistor M1 charges the data capacitor CDT, which is a parasitic capacitor at the data line DT.

Figure 3A:
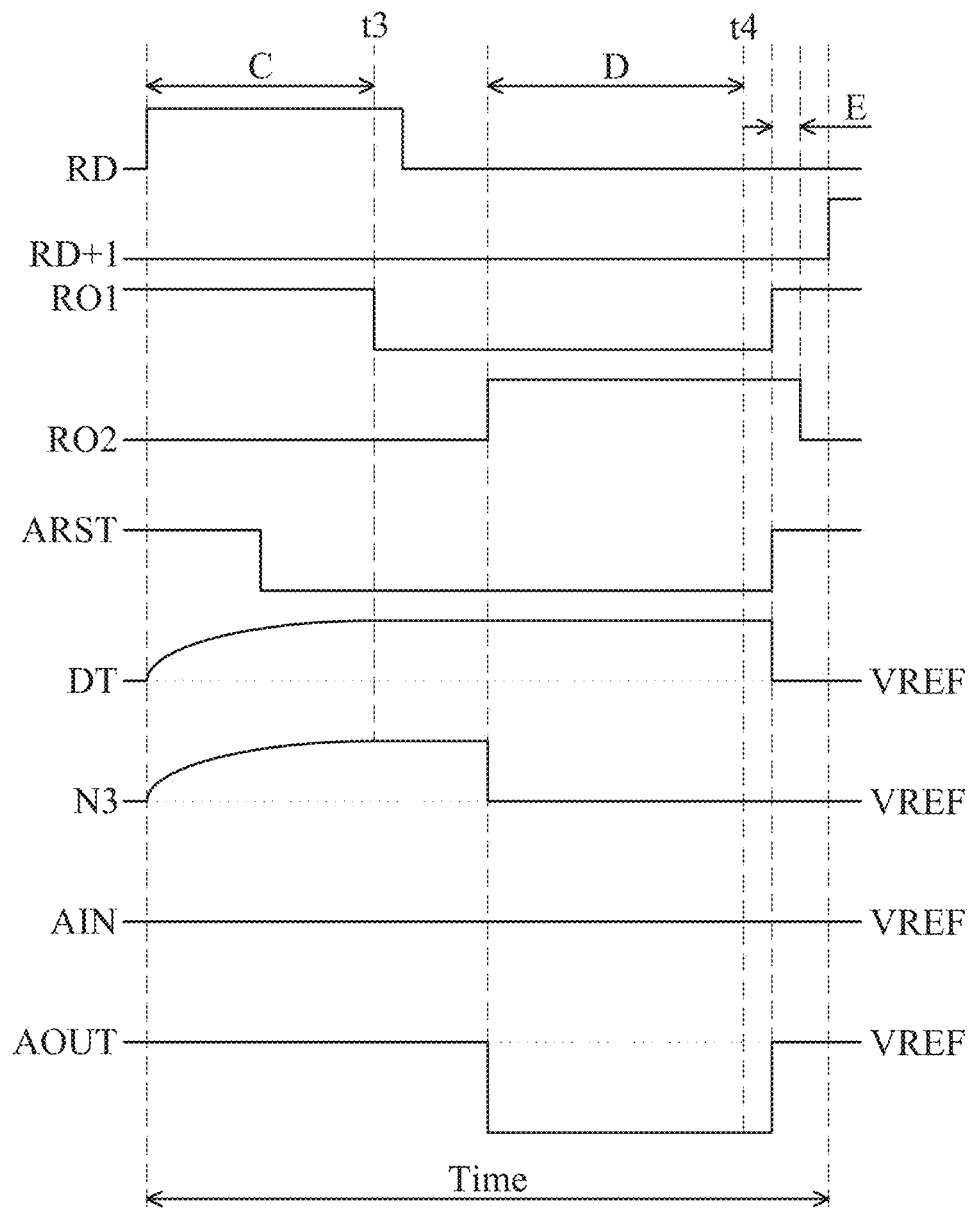
FIGS. 3A-3C illustrate operations of the sensing device in FIG. 2 in accordance with an embodiment of the disclosure.
Figure 3B:
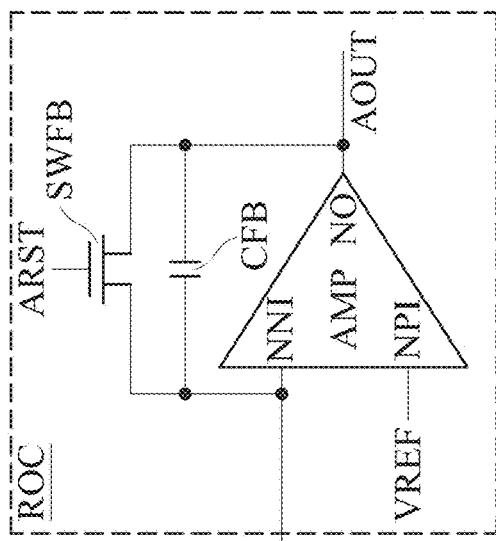
Figure 3B:
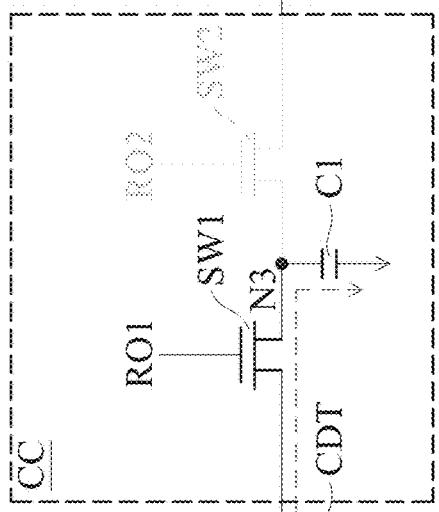
Figure 3B:
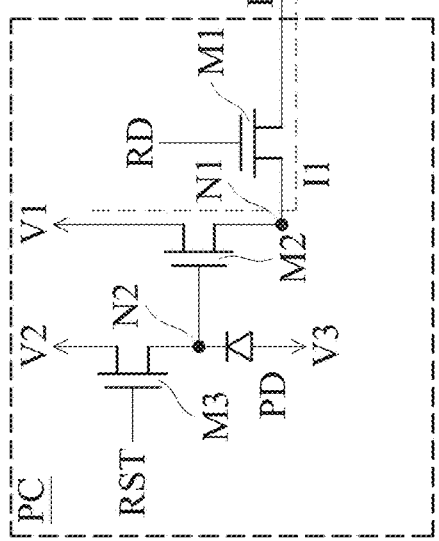
Figure 3C:
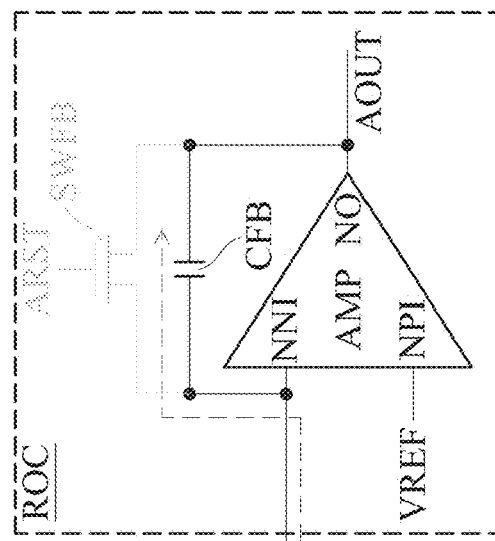
Figure 3C:
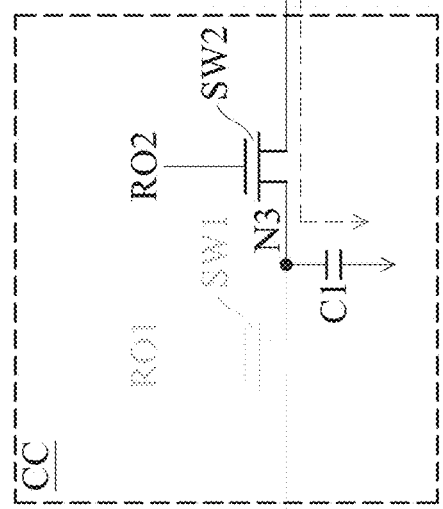
Figure 3C:
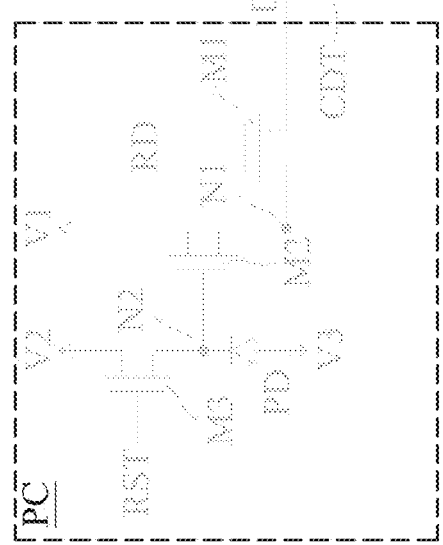

FIGS. 3A-3C illustrate operations of the sensing device in FIG. 2 in accordance with an embodiment of the disclosure. As shown in FIGS. 3A and 3B, during period C, the select signal RD, the first readout signal RO1, and the amp-reset signal ARST are in high logic level, and the second readout signal RO2 is at the low logic level. The first transistor M1, the first switch SW1, and the feedback switch SWFB are turned on, and the second switch SW2 is turned off The second transistor M2 generates the first current I1 to charge the data capacitor CDT and the first capacitor C1. The voltages of first node N1, the data line DT, and the third node N3 at moment t3 are expressed as Eq. 1 according to the current equation of the second transistor M2, where $V_{N3}$ (t3) denotes the voltage of the third node N3 at moment t3.

$$V_{N1}(t3) = V_{DT}(t3) = V_{N3}(t3) = V_{N2} - Vth - \sqrt{\frac{2/1(t3) \cdot L}{W \cdot \mu \cdot COX}} \quad \text{(Eq. 1)}$$

Charge of the data capacitor CDT at moment t3 and charge of the first capacitor C1 at moment t3 can be expressed as Eq. 2 and Eq. 3 respectively.

$$Q_{DT}(t3) \times V_{DT}(t3) \times CDT \quad \text{(Eq. 2)}$$

$$Q_{N3}(t3) \times V_{DT}(t3) \times C1 \quad \text{(Eq. 3)}$$

Due to the property of virtual short of an ideal amplifier, the read signal AIN of the negative input node NNI is equal to the reference voltage VREF of the positive input node NPI. In addition, during period C, the amp-reset signal ARST is at the high logic level to turn on the feedback switch SWFB, and the output signal AOUT is reset to the reference voltage VREF. The charge stored in the feedback capacitor CFB at moment t3 can be expressed as Eq. 4.

$$Q_{FB}(t3) = (V_{AIN} - V_{AOUT}(t3)) \times CFB = 0 \times CFB = 0 \quad \text{(Eq. 4)}$$

As shown in FIGS. 3A and 3C, during period D, the select signal RD, the first readout signal RO1, and the amp-reset signal ARST are at the low logic level, and the second readout signal RO2 is at the high logic level, and the first transistor M1, the first switch SW1, and the feedback switch SWFB are turned off and the second switch SW2 is turned on. The voltage of the third node N3 at moment t4 is equal to the reference voltage VREF due to the property of virtual short of an ideal amplifier, and at least part of the charge of the first capacitor C1 is distributed to the feedback capacitor CFB to generate the output signal AOUT. The charge stored in the first capacitor C1 at moment t4 and the charge stored in the feedback capacitor CFB at moment t4 are expressed as Eq. 5 and Eq. 6 respectively.

$$Q_{N3}(t4) = V_{N3}(t4) \times C1 = VREF \times C1 \quad \text{(Eq. 5)}$$

$$Q_{FB}(t4) = \{V_{AIN} - V_{AOUT}(t4)\} \times CFB \quad \text{(Eq. 6)}$$
$$= \{VREF - V_{AOUT}(t4)\} \times CFB$$

Based on charge conservation, the sum of Eq. 3 and Eq. 4 should be equal to the sum of Eq. 5 and Eq. 6. The output signal AOUT at moment t4 can be expressed as Eq. 7.

$$Q_{N3}(t3) + Q_{FB}(t3) = Q_{N3}(t4) + Q_{FB}(t4) \quad \text{(Eq. 7)}$$
$$V_{DT}(t3) \times C1 + 0 = VREF \times C1 + \{VREF - V_{AOUT}(t4)\} \times CFB$$
$$V_{AOUT}(t4) = \{VREF - V_{DT}(t3)\} \times \frac{C1}{CFB} + VREF$$

The voltage of the third node N3 at moment t3, i.e., $V_{N3}(t3)$, as expressed in Eq. 1 can be incorporated into Eq. 7, which is expressed in Eq. 8.

$$V_{AOUT}(t4) = \left\{ VREF - V_{N2} + Vth + \sqrt{\frac{2I1(t3) \cdot L}{W \cdot \mu \cdot COX}} \right\} \times \frac{C1}{CFB} + VREF \quad \text{(Eq. 8)}$$

In Eq. 8, in order to keep the linear response of the amplifier AMP, the ratio of the first capacitor C1 to the feedback capacitor CFB should be properly controlled, which is expressed in Eq. 9.

$$(V_{N2,HIGH} - V_{N2,LOW}) \times \frac{C1}{CFB} \leq (V_{AOUT,HIGH} - V_{AOUT,LOW}) \quad \text{(Eq. 9)}$$

In other words, the ratio of the first capacitor C1 to the feedback capacitor CFB may be considered related to the gain of the readout circuit ROC. Since the capacitance of the first capacitor C1 and that of the feedback capacitor CFB are both controllable, the gain of the readout circuit ROC can be controlled in a linear range even when the capacitance of the data capacitor CDT, which is the parasitic capacitance of the data line DT, is great.

During period E, the select signal RD is at the low logic level, and the first readout signal RO1, the second readout signal RO2, and the amp-reset signal ARST are at the high logic level, and the voltages of the data line DT, and the output node NO are reset to the reference voltage VREF.

Figure 4:
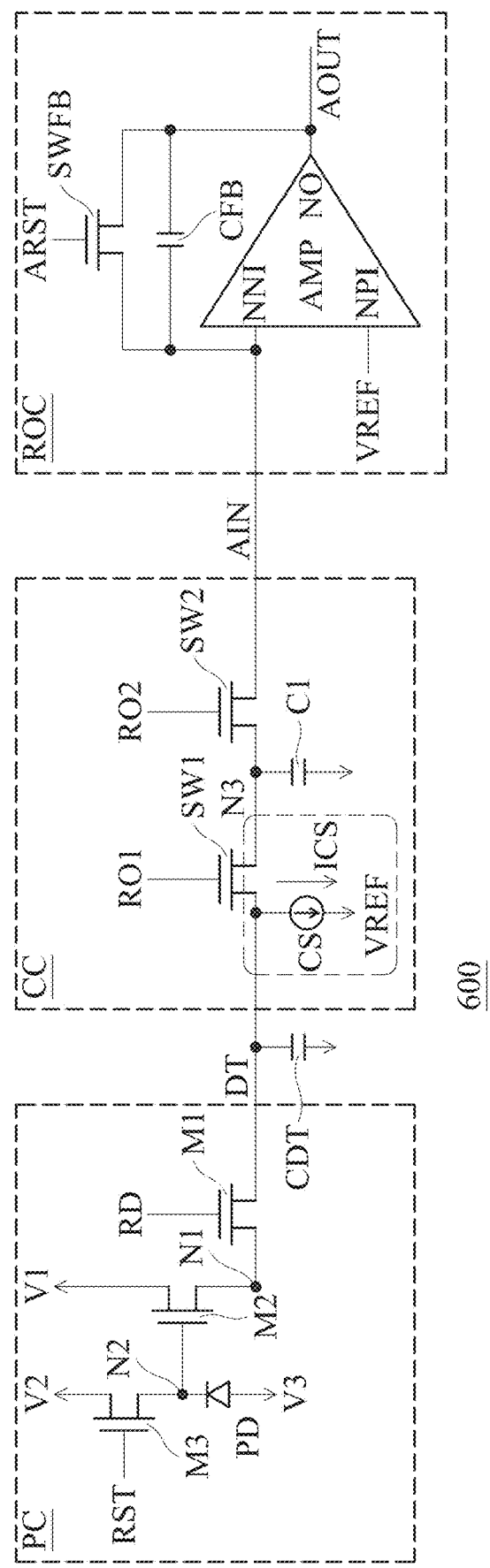
FIG. 4 is a schematic diagram of a sensing device in accordance with another embodiment of the disclosure.

FIG. 4 is a schematic diagram of a sensing device in accordance with another embodiment of the disclosure. Comparing the sensing device 600 with the sensing device 400 in FIG. 2, the sensing device 600 further includes a current source CS, which is electrically connected between the data line DT and the reference voltage VREF. The current source CS generates a constant current ICS flowing from the data line DT to the reference voltage VREF.

Figure 5:
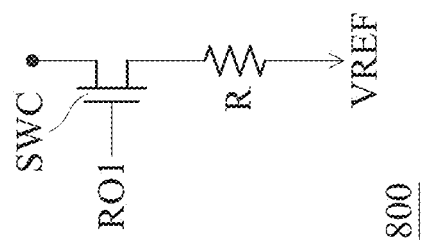
FIG. 5 is a schematic diagram of the current source in FIG. 4 in accordance with an embodiment of the disclosure.

FIG. 5 is a schematic diagram of the current source in FIGS. 4 in accordance with an embodiment of the disclosure. As shown in FIG. 5, the current source 800 includes a current switch SWC and a resistor R. Referring to FIG. 4, the current switch SWC is electrically connected between the data line DT and the resistor R and controlled by the first readout signal RO1. In other words, the current switch SWC and the first switch SW1 are turned on/off simultaneously. The resistor R is electrically connected between the current switch SWC and the reference voltage VREF.

Figure 6A:
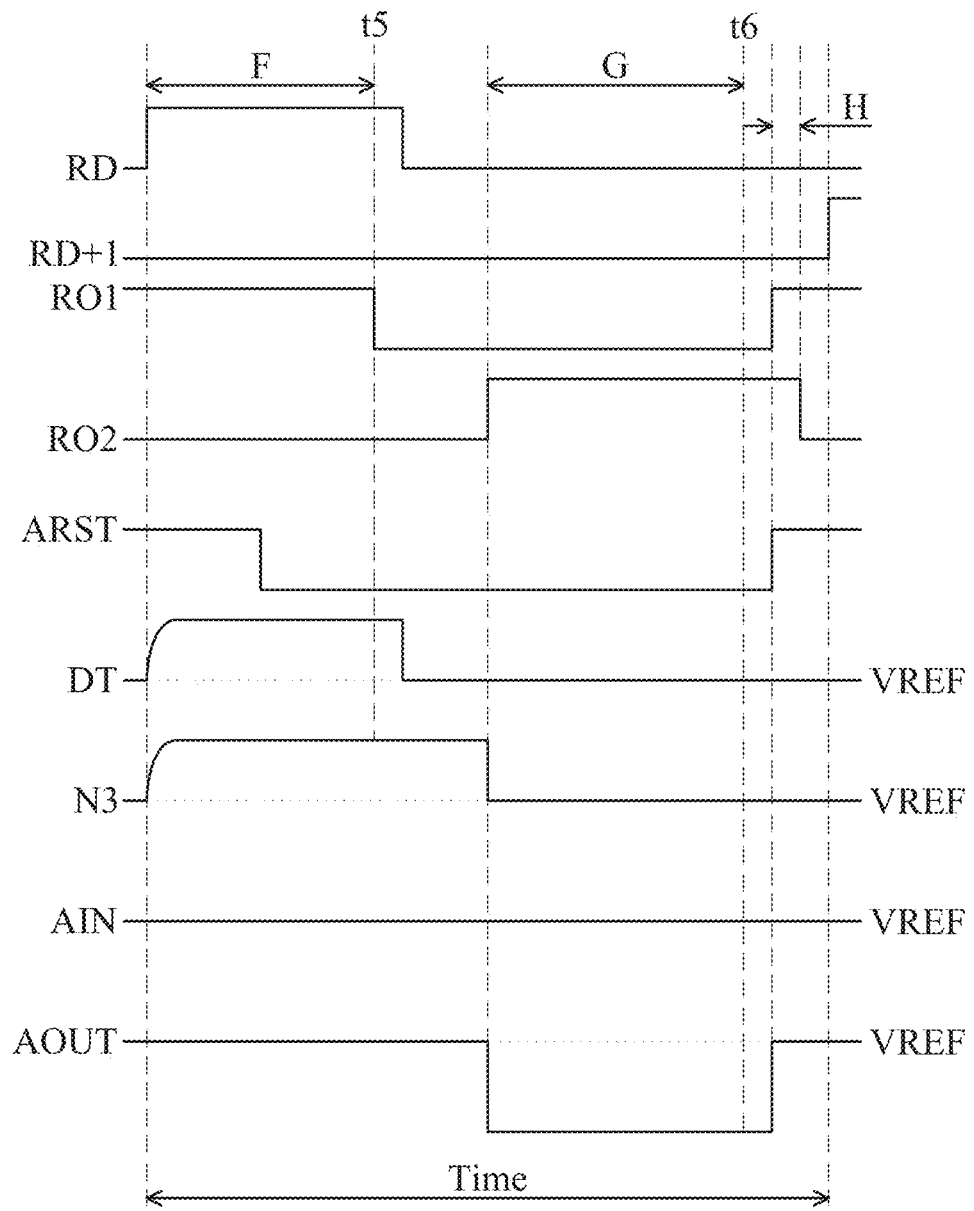

FIGS. 6A-6C illustrate operations of the sensing device in FIG. 4 in accordance with another embodiment of the disclosure. As illustrated in FIGS. 6B and 6C, the current source CS is electrically connected to the data line DT, but not limited thereto. According to another embodiment of the disclosure, the current source CS may be electrically connected to the first node N1 as shown in FIG. 4, and the operations are similar to those in FIGS. 6A-6C.

As shown in FIGS. 6A and 6B, during period F, the select signal RD, the first readout signal RO1, and the amp-reset signal ARST are in high logic level, and the second readout signal RO2 is at the low logic level. The first transistor M1, and the first switch SW1, are turned on.

The second transistor M2 generates the first current I1 to charge the data capacitor CDT and the first capacitor C1. As the voltage of first node N1 and the voltage of the data line DT are saturated at moment t5, the first current I1 eventually reaches the constant current ICS. The voltages of the first node N1, the data line DT, and the third node N3 at moment t5 are then determined by the constant current ICS, which can be expressed as Eq. 10.

$$V_{N1}(t5) = V_{DT}(t5) = V_{N3}(t5) = V_{N2} - Vth - \sqrt{\frac{2ICS \cdot L}{W \cdot \mu \cdot COX}} \quad \text{(Eq. 10)}$$

Charge of the data capacitor CDT at moment t5 and charge of the first capacitor C1 at moment t5 can be expressed as Eq. 11 and Eq. 12 respectively.

$$Q_{DT}(t5) = V_{DT}(t5) \times CDT \quad \text{(Eq. 11)}$$
$$Q_{N3}(t5) = V_{DT}(t5) \times C1 \quad \text{(Eq. 12)}$$

Due to the property of virtual short of an ideal amplifier, the read signal AIN of the negative input node NNI is equal to the reference voltage VREF of the positive input node NPI. In addition, during period F, the amp-reset signal ARST is at the high logic level to turn on the feedback switch SWFB, and the output signal AOUT is also equal to the reference voltage VREF. The charge stored in the feedback capacitor CFB at moment t5 can be expressed as Eq. 13.

$$Q_{FB}(t5) = (V_{AIN} - V_{AOUT}(t5)) \times CFB = 0 \times CFB = 0 \quad \text{(Eq. 13)}$$

As shown in FIGS. 6A and 6C, during period G, the select signal RD, the first readout signal RO1, and the amp-reset signal ARST are at the low logic level, and the second readout signal RO2 is in the high logic level, and the first transistor M1, the first switch SW1, and the feedback switch SWFB is turned off and the second switch SW2 is turned on. The voltage of the third node N3 at moment t6 is equal to the reference voltage VREF due to the property of virtual short of an ideal amplifier, and at least part of the charge of the first capacitor C1 is distributed to the feedback capacitor CFB to generate the output signal AOUT. The charge stored in the first capacitor C1 at moment t6 and the charge stored in the feedback capacitor CFB at moment t6 are expressed as Eq. 14 and Eq. 15 respectively.

$$Q_{N3}(t6) = V_{N3}(t6) \times C1 = VREF \times C1 \quad \text{(Eq. 14)}$$
$$Q_{FB}(t6) = \{V_{AIN} - V_{AOUT}(t6)\} \times CFB \quad \text{(Eq. 15)}$$
$$= \{VREF - V_{AOUT}(t6)\} \times CFB$$

Based on charge conservation, the sum of Eq. 12 and Eq. 13 should be equal to the sum of Eq. 14 and Eq. 15, which can be expressed as Eq. 16.

$$Q_{N3}(t5) + Q_{FB}(t5) = Q_{N3}(t6) + Q_{FB}(t6) \quad \text{(Eq. 16)}$$

$$V_{DT}(t5) \times C1 + 0 = VREF \times C1 + \{VREF - V_{AOUT}(t6)\} \times CFB$$

$$V_{AOUT}(t6) = \{VREF - V_{DT}(t5)\} \times \frac{C1}{CFB} + VREF$$

The voltage of the third node N3 at moment t5, i.e., $V_{N3}(t5)$, as expressed in Eq. 10 can be incorporated into Eq. 16, which is expressed in Eq. 17.

$$V_{AOUT}(t6) = \left\{ VREF - V_{N2} + Vth + \sqrt{\frac{2ICS \cdot L}{W \cdot \mu \cdot COX}} \right\} \times \frac{C1}{CFB} + VREF \quad \text{(Eq. 17)}$$

During period H, the select signal RD is at the low logic level, and the first readout signal RO1, the second readout signal RO2, and the amp-reset signal ARST are in the high logic level, and the output node NO are reset to the reference voltage VREF.

Figure 7:
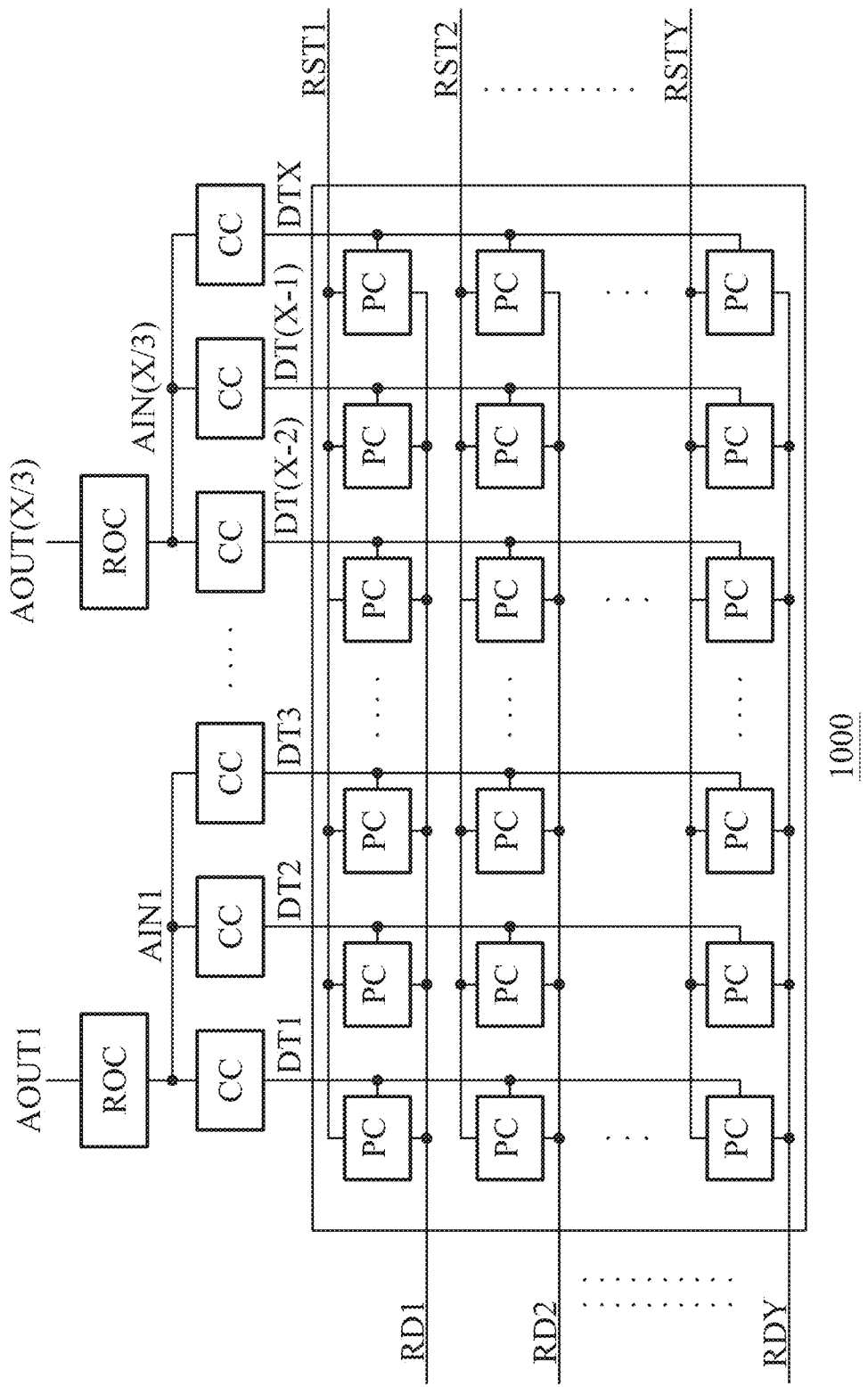
FIG. 7 is a schematic diagram of a pixel array in accordance with another embodiment of the disclosure.

FIG. 7 is a schematic diagram of a pixel array in accordance with another embodiment of the disclosure. Comparing the pixel array 1000 with the pixel array 100 in FIG. 1, one readout circuit ROC is electrically connected to three columns of pixel circuits PC and three column circuits CC, and the number of the readout circuits ROC in the pixel array 1000 is one-third of that of the pixel array 100 in FIG. 1, thereby reducing the total area of all the readout circuits ROC. According to other embodiments of the disclosure, the readout circuit ROC may be electrically connected to any number of columns of pixel circuits PC and that of column circuits CC. One readout circuit ROC electrically connected to three columns of pixel circuits PC and three column circuits CC as shown in FIG. 7 is merely illustrated herein, but not intended to be limited thereto.

According to an embodiment of the disclosure, each of the column circuits CC in FIG. 7 may be the column circuit CC as shown in FIG. 2. According to another embodiment of the disclosure, each of the column circuits CC in FIG. 7 may be similar to the column circuit CC as shown in FIG. 4.

Figure 8:
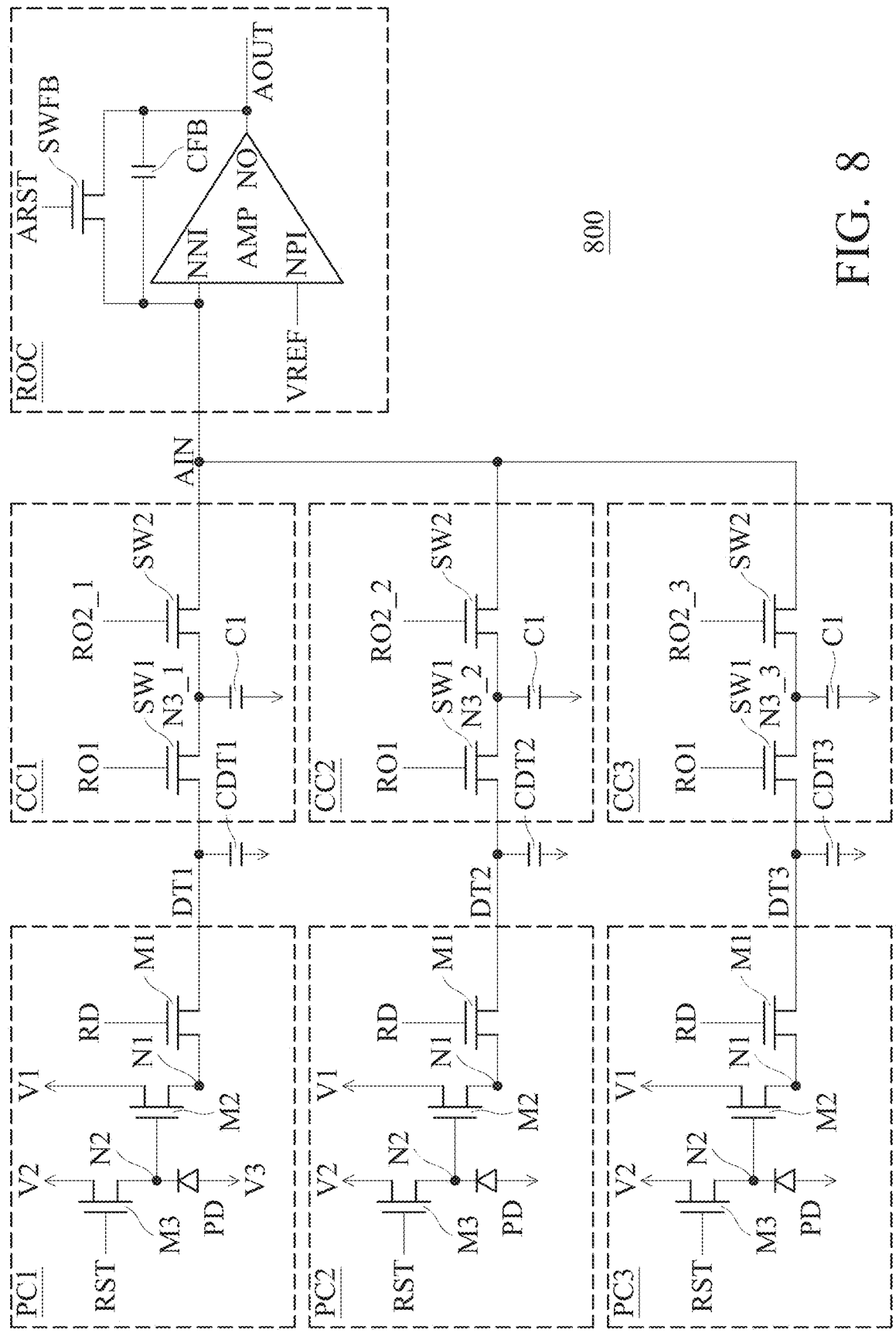
FIG. 8 is a schematic diagram of a sensing device in accordance with another embodiment of the disclosure.

FIG. 8 is a schematic diagram of a sensing device in accordance with another embodiment of the disclosure. As shown in FIG. 8, the sensing device 800 includes a first pixel circuit PC1, a second pixel circuit PC2, a third pixel circuit PC3, a first column circuit CC1, a second column circuit CC2, a third column circuit CC3, and a readout circuit ROC. According to an embodiment of the disclosure, the sensing device 800 illustrates a set of three pixel circuits PC, three column circuits CC, and one readout circuit ROC as shown in FIG. 7, in which the readout circuit ROC in FIG. 8 corresponds to one of the readout circuits ROC in FIG. 7.

Referring to FIG. 2 and FIG. 8, the first pixel circuit PC1, the second pixel circuit PC2, and the third pixel circuit PC3 in FIG. 8 are similar to the pixel circuit PC in FIG. 2, and the first column circuit CC1, the second column circuit CC2, and the third column circuit CC3 are similar to the column circuit CC in FIG. 2. The readout circuit ROC in FIG. 8 is electrically connected to the first pixel circuit PC1, the second pixel circuit PC2, the third pixel circuit PC3, the first column circuit CC1, the second column circuit CC2, and the third column circuit CC3.

Figure 9A:
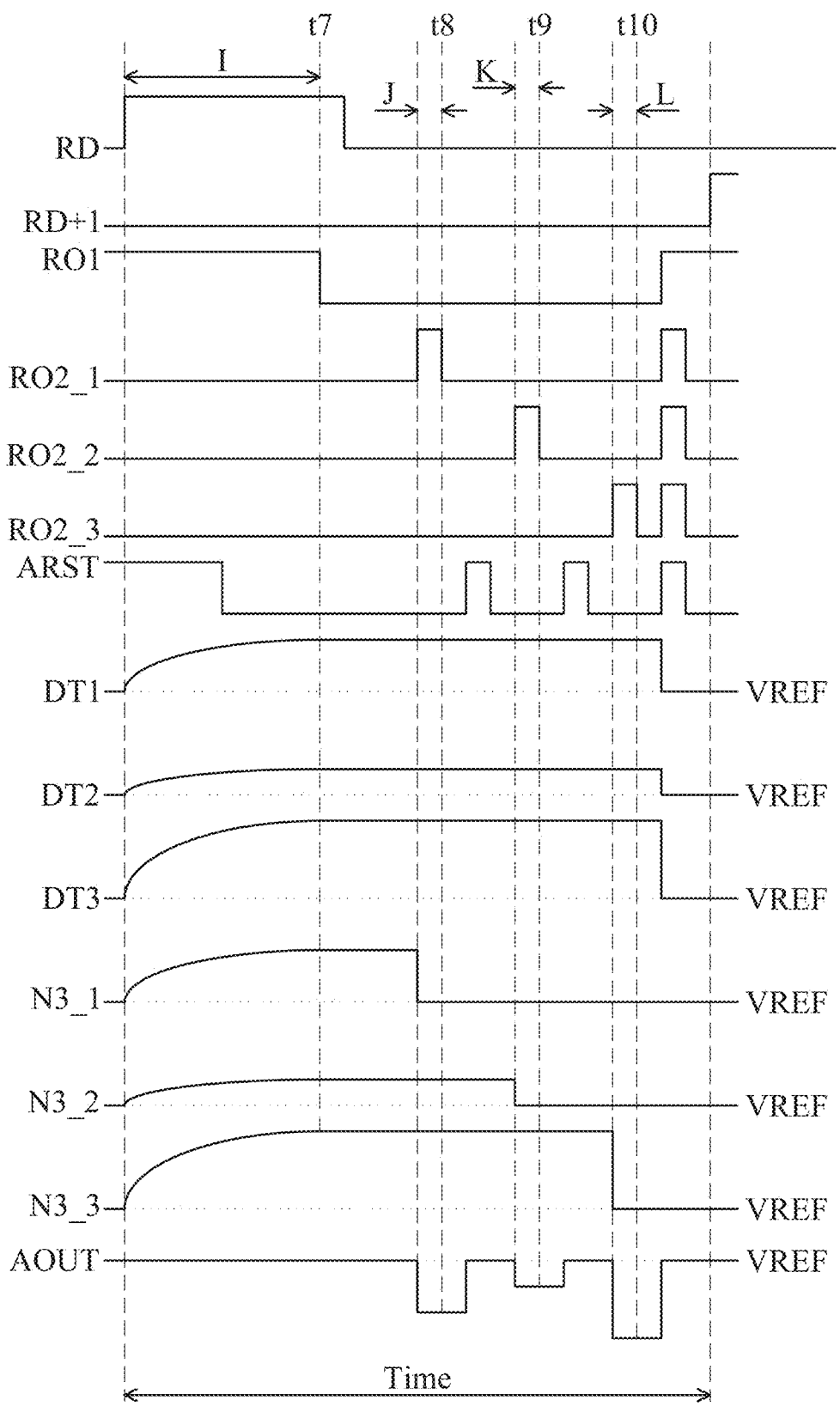
FIGS. 9A-9E illustrate operations of the sensing device in FIG. 8 in accordance with another embodiment of the disclosure.
Figure 9B:
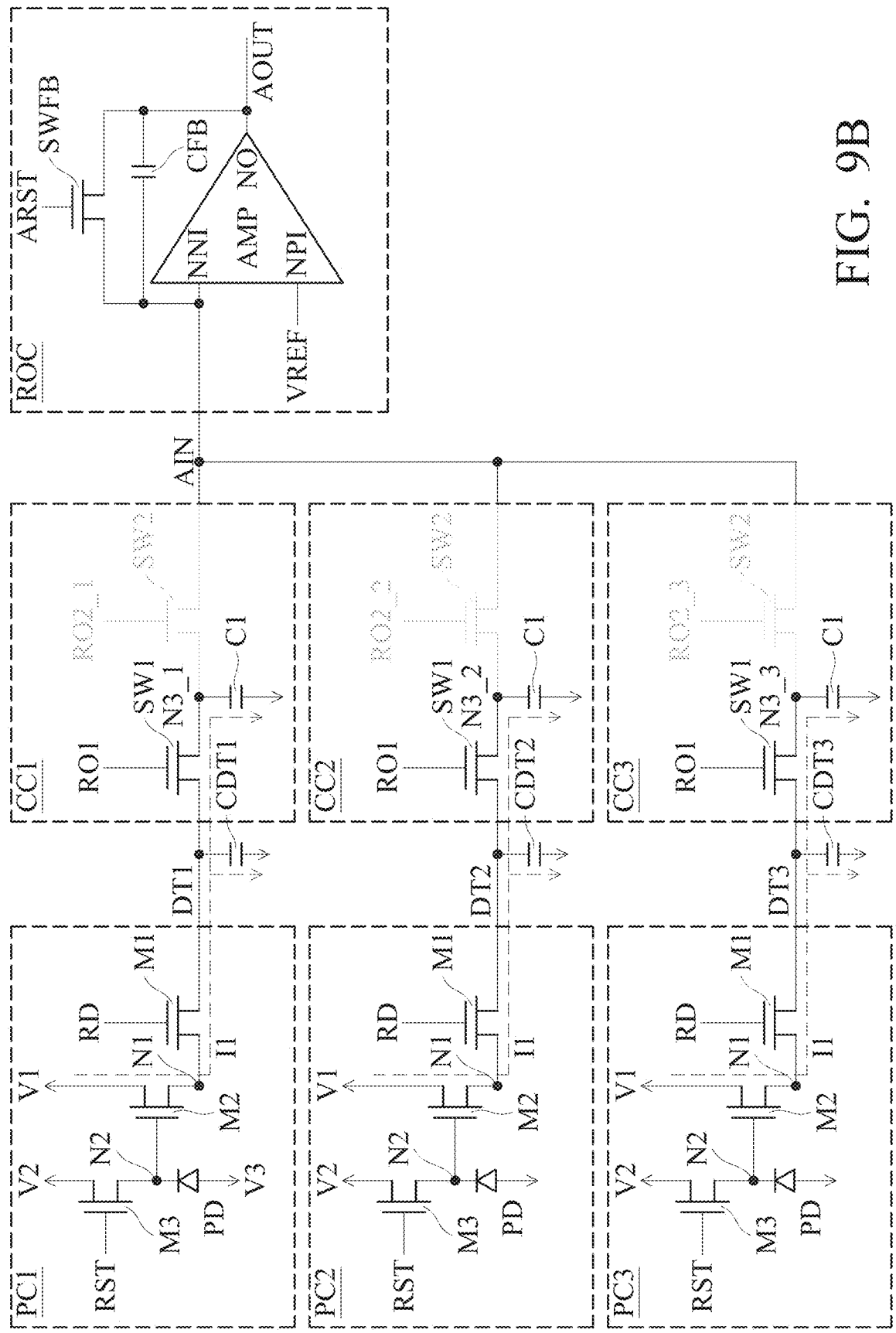

FIGS. 9A-9E illustrate operations of the sensing device in FIG. 8 in accordance with another embodiment of the disclosure. As shown in FIGS. 9A and 9B, during period I, the select signal RD, the first readout signal RO1, and the amp-reset signal ARST are in high logic level, and the first-second readout signal RO2_1, the second-second readout signal RO2_2, and the third-second readout signal RO2_3 are at the low logic level. The first transistors M1 of the first pixel circuit PC1, the second pixel circuit PC2, and the third pixel circuit PC3 and the first switches SW1 of the first column circuit CC1, the second column circuit CC2, and the third column circuit CC3 are turned on, and the second switches SW2 of the first column circuit CC1, the second column circuit CC2, and the third column circuit CC3 are turned off. The first data capacitor CDT1, the second data capacitor CDT2, the third data capacitor CDT3, and the first capacitors C1 of the first column circuit CC1, the second column circuit CC2, and the third column circuit CC3 are simultaneously charged.

The voltages of first nodes N1 of the first pixel circuit PC1, the second pixel circuit PC2, and the third pixel circuit PC3 and the voltages of the first data line DT1, the second data line DT2, and the third data line DT3 at moment t7 may be respectively expressed as Eq. 1. Charge of the first data capacitor CDT1, the second data capacitor CDT2, and the third data capacitor CDT3 at moment t7 and charge of the first capacitor C1 of the first column circuit CC1, the second column circuit CC2, and the third column circuit CC3 at moment t7 can be respectively expressed as Eq. 2 and Eq. 3. The charge stored in the feedback capacitor CFB at moment t7 can be expressed as Eq. 4.

Figure 9C:
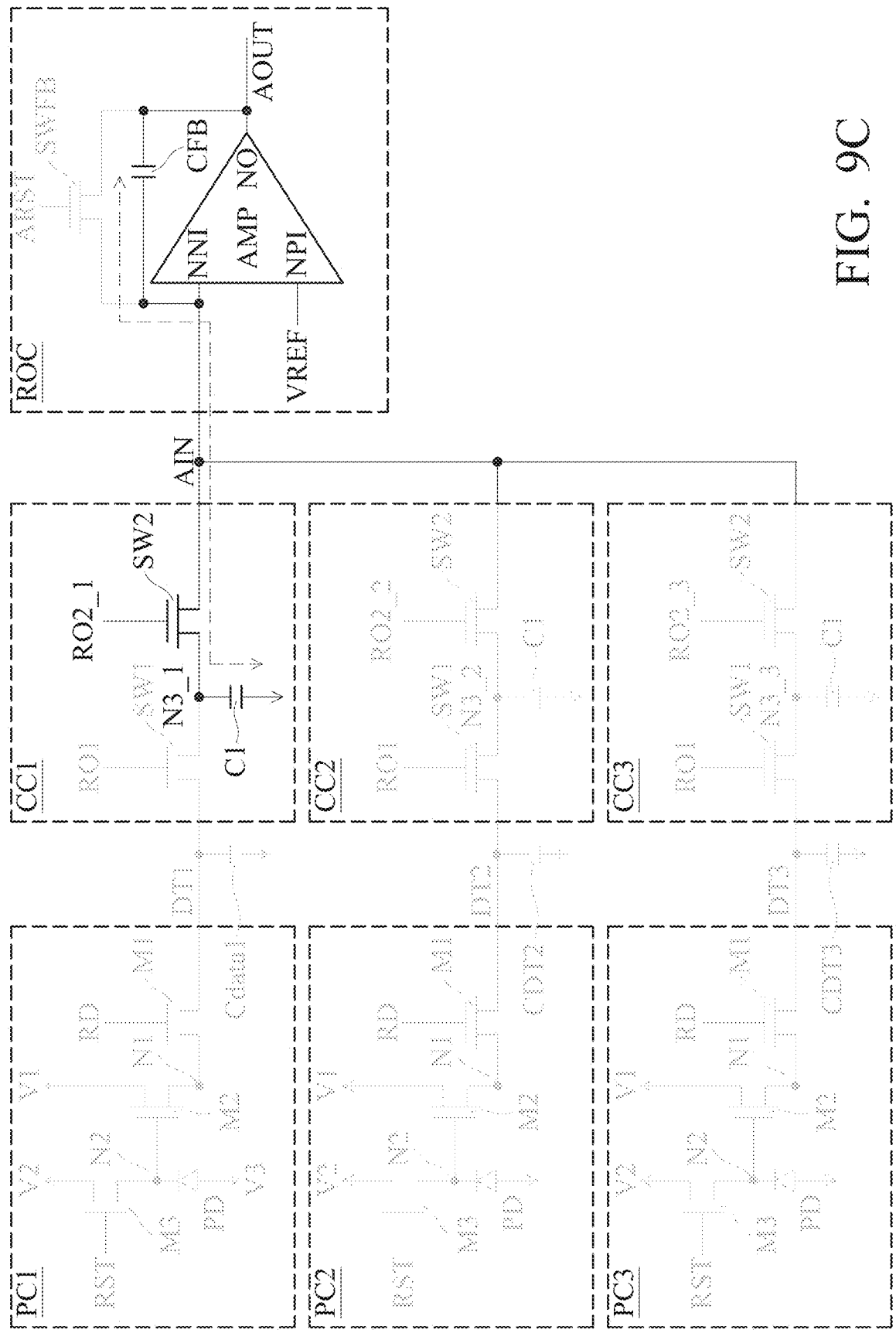

As shown in FIGS. 9A and 9C, during period J, period K, and period L, the select signal RD, the first readout signal RO1, and the amp-reset signal ARST are at the low logic level, and the first-second readout signal RO2_1, the second-second readout signal RO2_2, and the third-second readout signal RO2_3 go to the high logic level respectively. As a result, the first transistors M1 of the first pixel circuit PC1, the second pixel circuit PC2, and the third pixel circuit PC3, the first switches SW1 of the first column circuit CC1, the second column circuit CC2, and the third column circuit CC3, and the feedback switch SWFB are turned off and the second switches SW2 of the first column circuit CC1, the second column circuit CC2, and the third column circuit CC3 are respectively turned on at different time, that is, during the period J, period K, and period L which follow the period I, only one of the second switches SW2 of the first column circuit CC1, the second column circuit CC2, and the third column circuit CC3 is turned on. When one of the second switches is turned on, at least part of the charge of the corresponding first capacitors C1 of the first column circuit CC1, the second column circuit CC2, and the third column circuit CC3 is distributed to the feedback capacitor CFB to generate the corresponding output signal AOUT respectively.

The charge stored in the first data capacitor CDT1, the second data capacitor CDT2, and the third data capacitor CDT3 at moment t8, moment t9, and moment t10 can be respectively expressed as Eq. 5. The charge stored in the feedback capacitor CFB at moment t8, moment t9, and moment t10 can be respectively expressed as Eq. 6. The output signal AOUT at moment t8, moment t9, and moment t10 can be respectively expressed as Eq. 8.

Figure 9D:
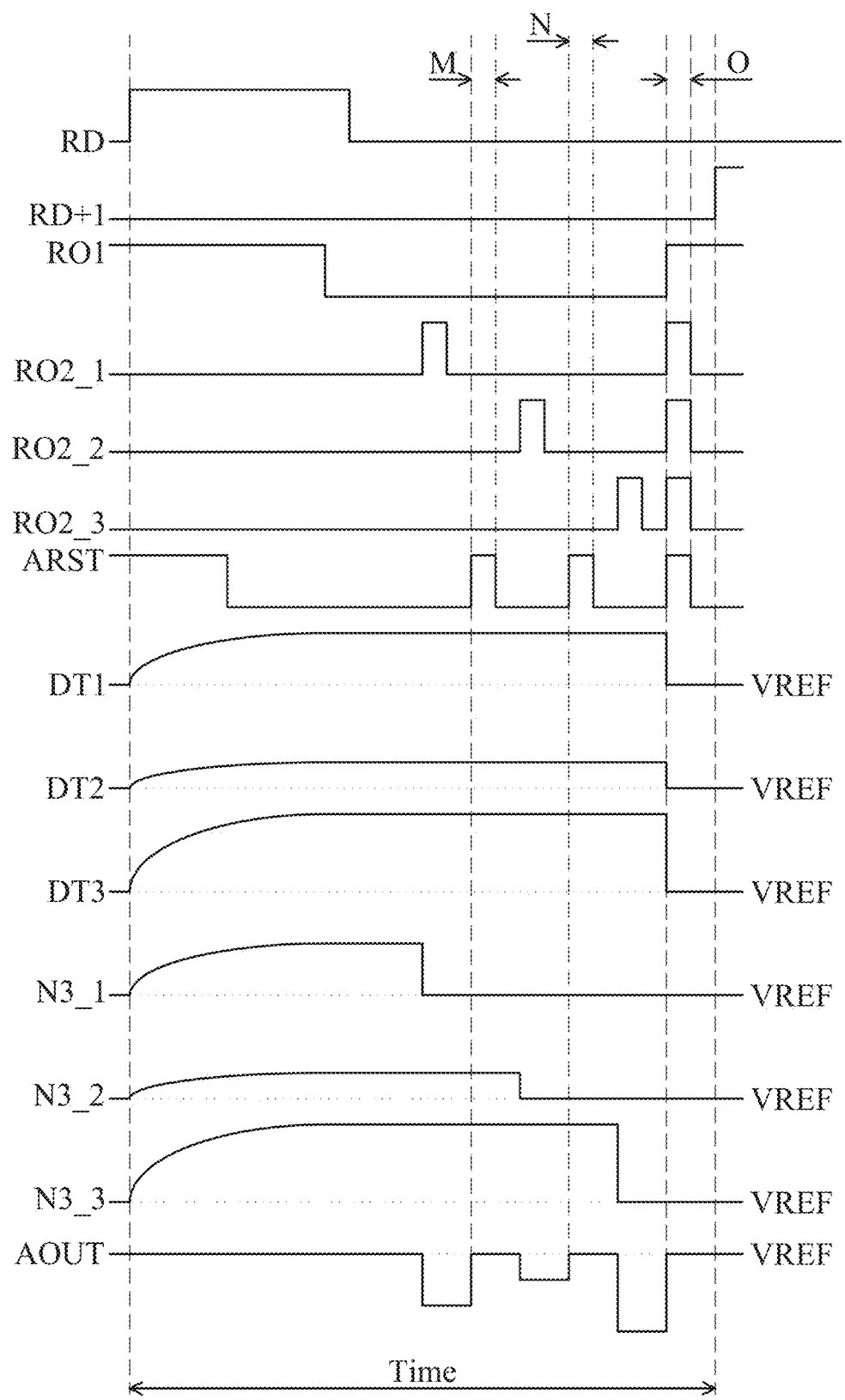
Figure 9E:
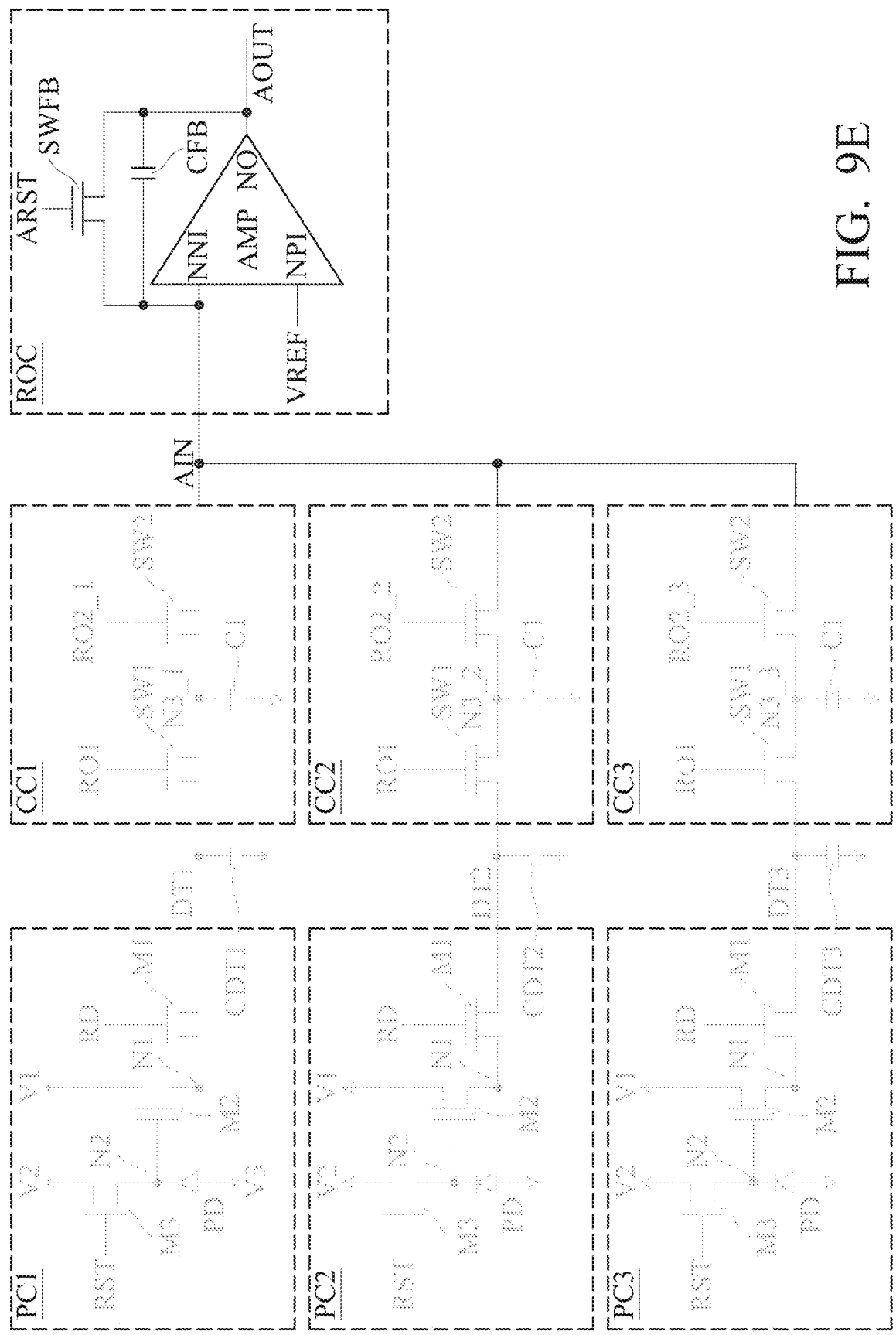

As shown in FIGS. 9D and 9E, during period M and period N, the first readout signal RO1 is kept at the low logic level, the first-second readout signal RO2_1 and the second-second readout signal RO2_2 are sequentially at the low logic level, and the amp-reset signal ARST goes to the high logic level, the output signal AOUT is reset to the reference signal VREF. In other words, after the first capacitors C1 of the first column circuit CC1 and the second column circuit CC2 have been read, the output signal AOUT is reset to the reference voltage VREF.

During period 0 which is a period after the periods that all the second switches are once turned on respectively (such as period J, period K, period L in FIG. 9A), the first readout signal RO1, the amp-reset signal ARST, the first-second readout signal RO2_1, the second-second readout signal RO2_2, and the third-second readout signal RO2_3 are in the high logic level, all the first switches SW1 and second switches SW2 are turned on again, and the voltages of the first data line DT1, the second data line DT2, the third data line DT3, and the output signal AOUT are reset to the reference voltage VREF.

Figure 10:
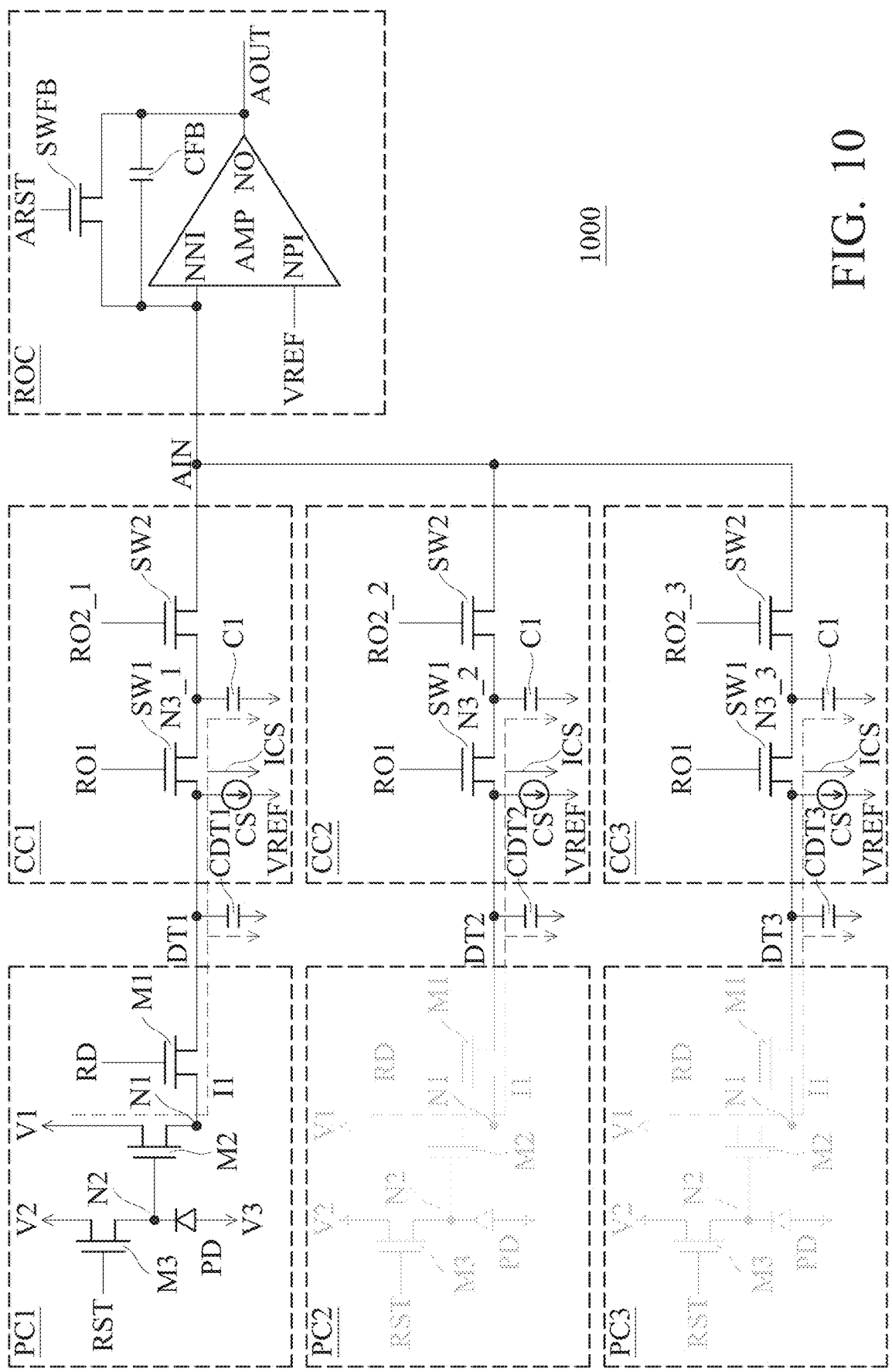
FIG. 10 is a schematic diagram of a sensing device in accordance with another embodiment of the disclosure.

FIG. 10 is a schematic diagram of a sensing device in accordance with another embodiment of the disclosure. As shown in FIG. 10, the sensing device 1000 includes a first pixel circuit PC1, a second pixel circuit PC2, a third pixel circuit PC3, a first column circuit CC1, a second column circuit CC2, a third column circuit CC3, and a readout circuit ROC According to another embodiment of the disclosure, the sensing device 1000 illustrates a set of three pixel circuits PC, three column circuits CC, and one readout circuit ROC in FIG. 7, in which the readout circuit ROC in FIG. 10 corresponds to one of the readout circuits ROC in FIG. 7.

Referring to FIG. 4 and FIG. 10, the first pixel circuit PC1, the second pixel circuit PC2, and the third pixel circuit PC3 in FIG. 10 are similar to the pixel circuit PC in FIG. 4, and the first column circuit CC1, the second column circuit CC2, and the third column circuit CC3 in FIG. 10 are similar to the column circuit CC in FIG. 4. The readout circuit ROC in FIG. 10 is electrically connected to the first pixel circuit PC1, the second pixel circuit PC2, the third pixel circuit PC3, the first column circuit CC1, the second column circuit CC2, and the third column circuit CC3. In other words, the current sources CS may be electrically connected to the first data line DT1, the second data line DT2, and the third data line DT3.

Figure 11A:
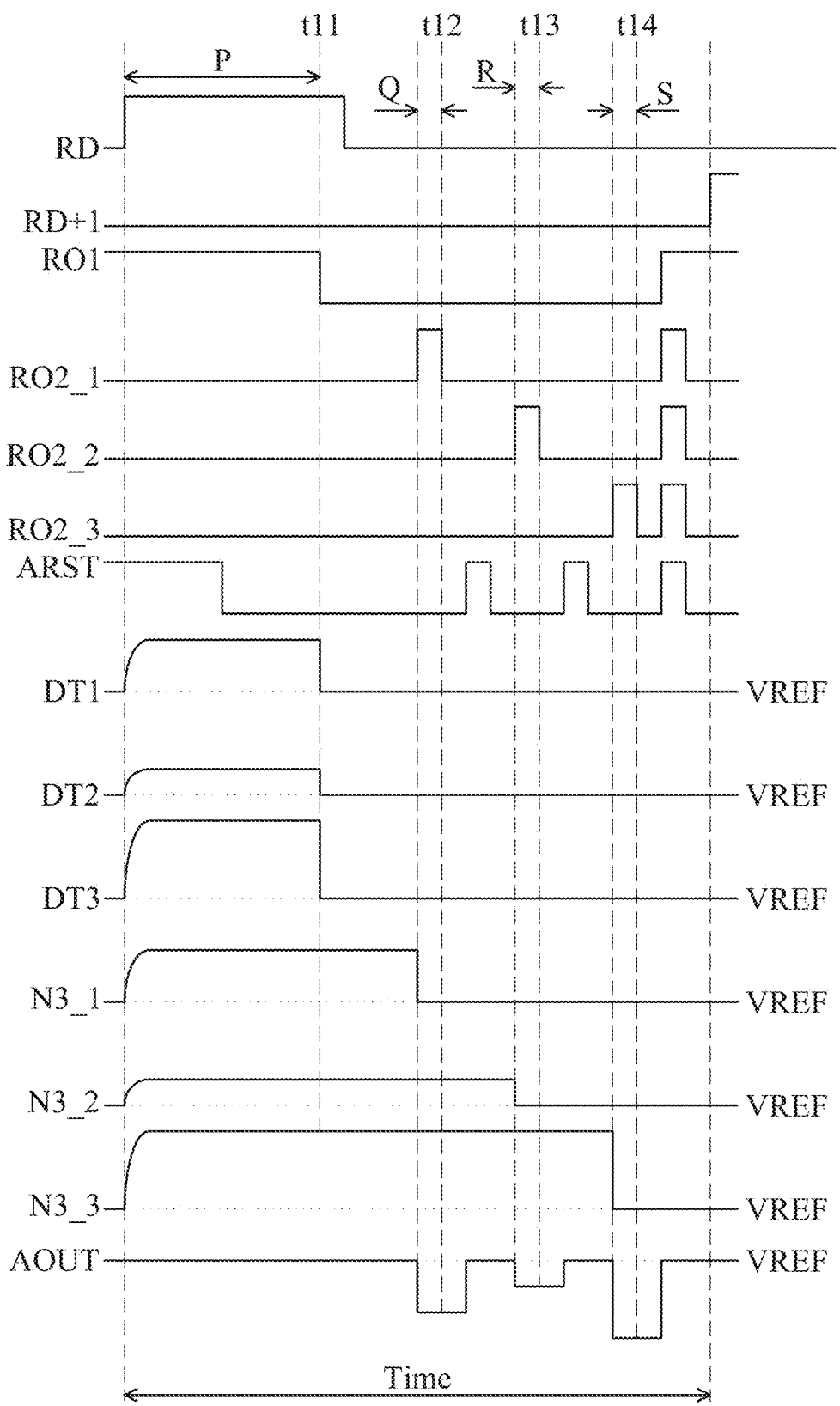
FIGS. 11A-11E illustrate operations of the sensing device in FIG. 10 in accordance with another embodiment of the disclosure.
Figure 11B:
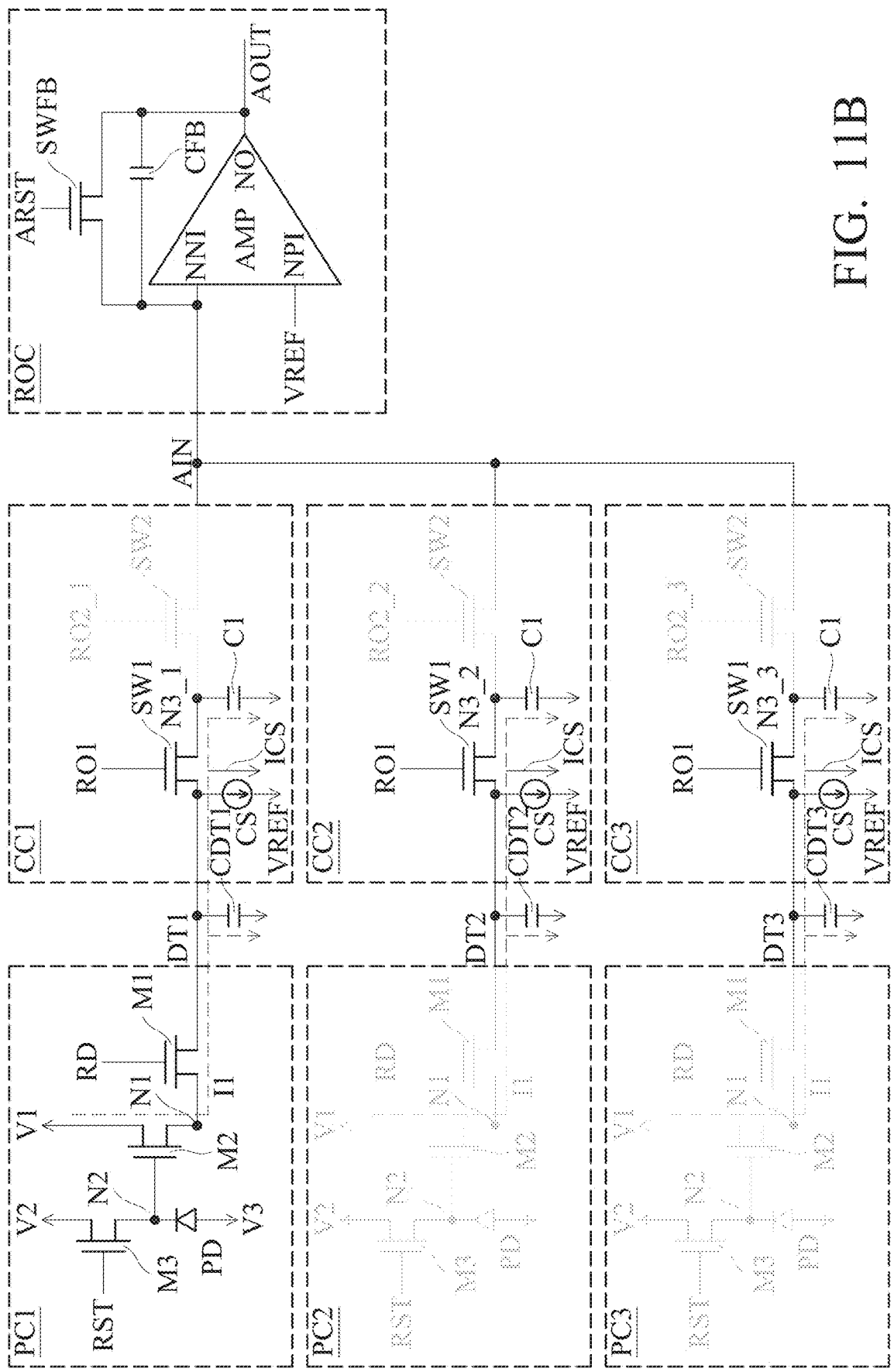

FIGS. 11A-11E illustrate operations of the sensing device in FIG. 10 in accordance with another embodiment of the disclosure. As shown in FIGS. 11A and 11B, during period P, the select signal RD, the first readout signal RO1, and the amp-reset signal ARST are in high logic level, and the first-second readout signal RO2_1, the second-second readout signal RO2_2, and the third-second readout signal RO2_3 are at the low logic level. The first transistors M1 of the first pixel circuit PC1, the second pixel circuit PC2, and the third pixel circuit PC3 and the first switches SWI are turned on, and the second switches SW2 of the first column circuit CC1, the second column circuit CC2, and the third column circuit CC3 are turned off The second transistors M2 of the first pixel circuit PC1, the second pixel circuit PC2, and the third pixel circuit PC3 generate the first currents I1 to charge the first data capacitor CDT1, the second data capacitor CDT2, the third data capacitor CDT3, and the first capacitors C1 of the first column circuit CC1, the second column circuit CC2, and the third column circuit CC3. As the voltages of first nodes N1 of the first pixel circuit PC1, the second pixel circuit PC2, and the third pixel circuit PC3, the first data capacitor CDT1, the second data capacitor CDT2, and the third data capacitor CDT3 are saturated at moment t11, the first currents I1 approach the constant current ICS. The voltages of the first nodes N1 of the first pixel circuit PC1, the second pixel circuit PC2, and the third pixel circuit PC3, the first data line DT1, the second data line DT2, the third data line DT3, the first-third node N3_1, the second-third node N3_2, and the third-third node N3_3 at moment t11 are then determined by the constant current ICS, which can be expressed as Eq. 10.

Figure 11C:
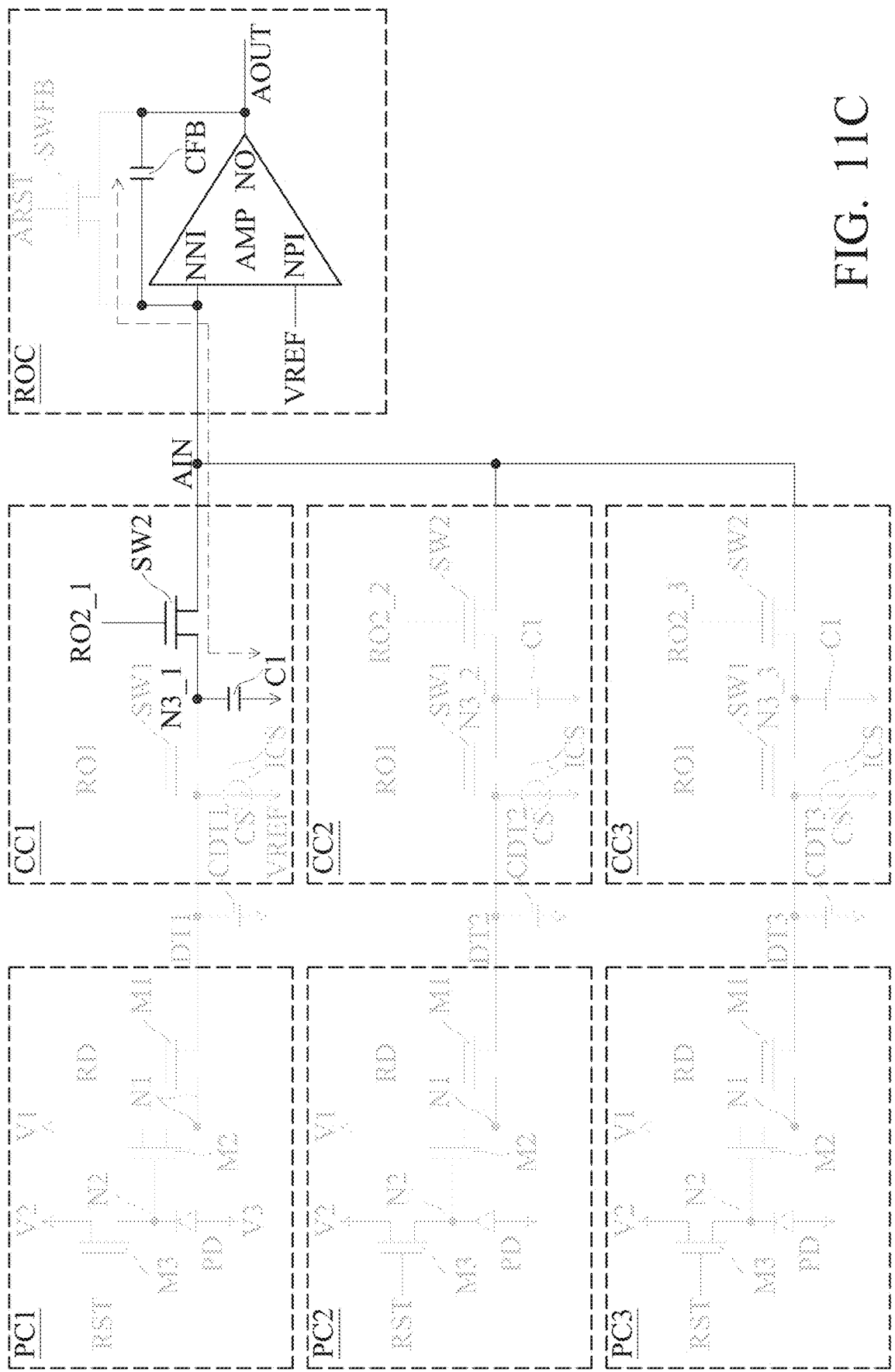

As shown in FIGS. 11A and 11C, during period Q, period R, and period S, the select signal RD, the first readout signal RO1, and the amp-reset signal ARST are at the low logic level, and the first-second readout signal RO2_1, the second-second readout signal RO2_2, and the third-second readout signal RO2_3 go to the high logic level respectively. As a result, the first transistors M1 of the first pixel circuit PC1, the second pixel circuit PC2, and the third pixel circuit PC3, the first switches SW1 of the first column circuit CC1, the second column circuit CC2, and the third column circuit CC3, and the feedback switch SWFB are turned off and the second switches SW2 of the first column circuit CC1, the second column circuit CC2, and the third column circuit CC3 are turned on respectively, and at least part of the charge of the first capacitors C1 of the first column circuit CC1, the second column circuit CC2, and the third column circuit CC3 are distributed to the feedback capacitor CFB to generate the corresponding output signal AOUT respectively.

The charge stored in the first capacitors C1 of the first column circuit CC1, the second column circuit CC2, and the third column circuit CC3 at moment t12, moment t13, and moment t14 can be respectively expressed as Eq. 14. The charge stored in the feedback capacitor CFB at moment t12, moment t13, and moment t14 can be respectively expressed as Eq. 15. The output signal AOUT at moment t12, moment t13, and moment t14 can be respectively expressed as Eq. 17.

Figure 11D:
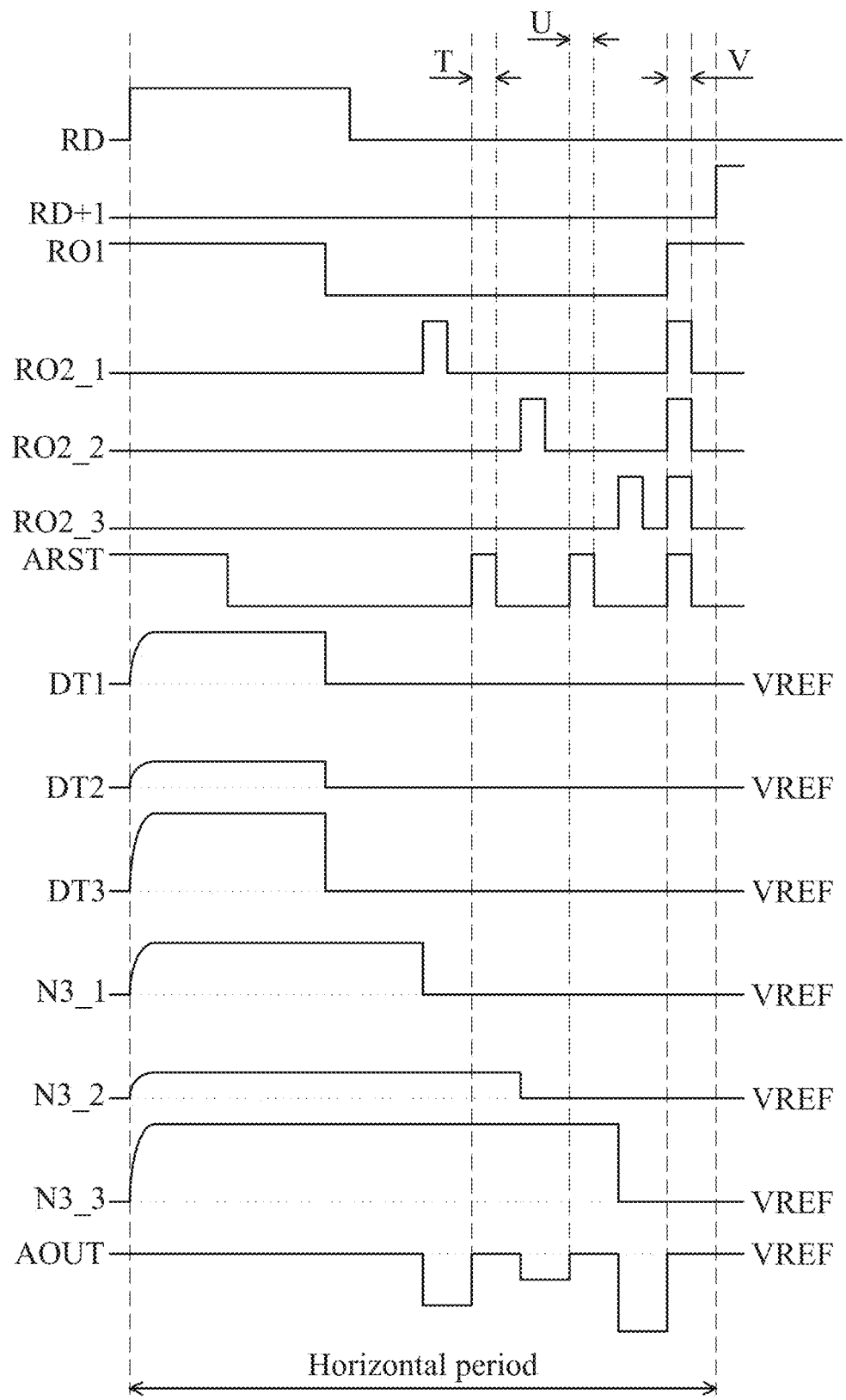
Figure 11E:
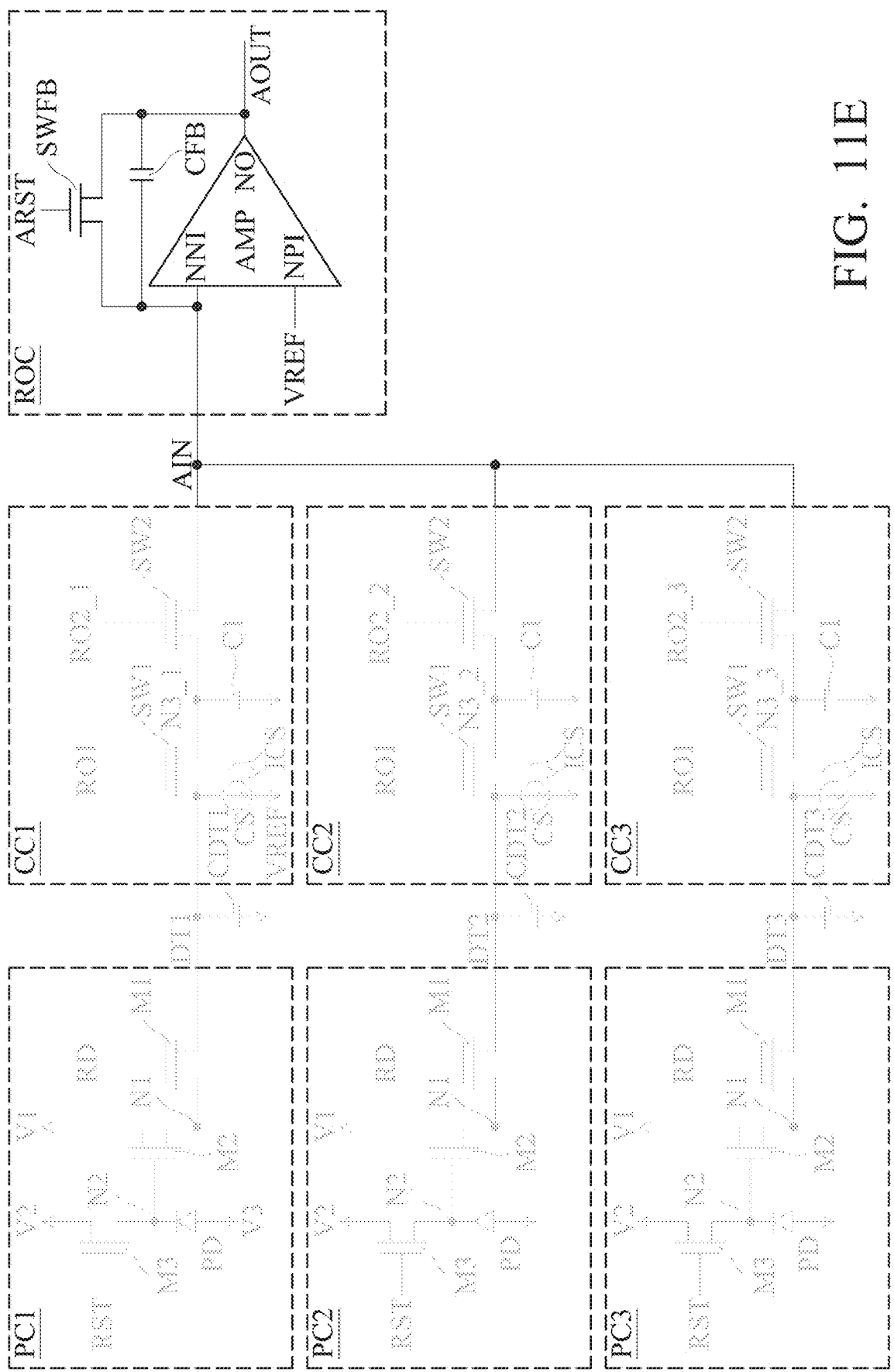

As shown in FIGS. 11D and 11E, during period T and the period U, the first readout signal RO1 is kept at the low logic level, the first-second readout signal RO2_1 and the second-second readout signal RO2_2 sequentially are at the low logic level, and the amp-reset signal ARST goes to the high logic level, the output signal AOUT is reset to the reference signal VREF. In other words, after the first capacitors C1 of the first column circuit CC1 or the second column circuit CC2 have been read, the output signal AOUT is reset to the reference voltage VREF.

During period V, the first readout signal RO1, the amp-reset signal ARST, the first-second readout signal RO2_1, the second-second readout signal RO2_2, and the third-second readout signal RO2_3 are in the high logic level, and the voltages of the first data line DT1, the second data line DT2, the third data line DT3, and the output signal AOUT are reset to the reference voltage VREF.

Sensing devices and pixel arrays are provided herein. Since the sensing device provided herein has an additional capacitor, the gain of the readout circuit is no more affected by the parasitic capacitor of the data line, and the gain of the readout circuit is much easier to control. In addition, one readout circuit may be electrically connected to any number of pixel circuits and that of column circuits in the pixel array provided herein, and the pixel array provided herein is more suitable for large-sized and high resolution applications.

Although some embodiments of the present disclosure and their advantages have been described in detail, it should be understood that various combinations, changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A sensing device, comprising:
   a first pixel circuit, wherein the first pixel circuit comprises:
   a first transistor, comprising a first terminal electrically connected to a first node and a second terminal electrically connected to a first data line;
   a second transistor, comprising a first terminal, a second terminal, and a control terminal, wherein the first terminal receives a first voltage, the second terminal is electrically connected to the first node, and the control terminal is electrically connected to a second node;
   a third transistor, comprising a first terminal receiving a second voltage and a second terminal electrically connected the second node; and
   a photodiode, comprising an anode and a cathode, wherein the anode is electrically connected to a third voltage and the cathode is electrically connected to the second node;
   a readout circuit, electrically connected to the first pixel circuit;
   a first switch, electrically connected between the first pixel circuit and the readout circuit;
   a second switch, electrically connected between the first switch and the readout circuit;
   and a first capacitor, comprising a first electrode, wherein the first electrode is electrically connected to the first switch and the second switch;
   wherein during a first period, the first transistor and the first switch are turned on, and the first capacitor is charged;
   wherein during a second period that follows the first period, the first transistor and the first switch are turned off and the second switch is turned on, and at least part of the charge of the first capacitor is distributed to generate an output signal.

2. The sensing device as defined in claim 1, wherein the readout circuit comprises:
   an amplifier, comprising an input node electrically connected to the second switch, and an output node generating an output signal;
   a feedback capacitor, electrically connected between the input node and the output node; and
   a feedback switch, electrically connected between the input node and the output node.

3. The sensing device as defined in claim 1, wherein during a third period that follows the second period, the first switch and the second switch are turned on, and a voltage of the output node is reset to the reference voltage.

4. The sensing device as defined in claim 1, further comprising:
   a first current source, electrically connected to a first data line between the first pixel circuit and the first switch, and generating a fixed current.

5. The sensing device as defined in claim 4, wherein the first current source further comprises:
   a current switch, electrically connected to the first data line; and
   a resistor, electrically connected between the current switch and a reference voltage.

6. The sensing device as defined in claim 5, wherein the current switch is controlled by a readout signal.

7. The sensing device as defined in claim 5, wherein the current switch and the first switch are turned on and turned off simultaneously.

8. The sensing device as defined in claim 1, further comprising:
   a second pixel circuit electrically connected to the readout circuit;
   a third switch, electrically connected between the second pixel circuit and the readout circuit;
   a fourth switch, electrically connected between the third switch and the readout circuit; and
   a second capacitor, comprising a first electrode, wherein the first electrode is electrically connected to the third switch and the fourth switch.

9. The sensing device as defined in claim 8, wherein the second pixel circuit comprises:
   a first transistor, comprising a first terminal electrically connected to a first node and a second terminal electrically connected to a second data line;
   a second transistor, comprising a first terminal, a second terminal, and a control terminal, wherein the first terminal receives a first voltage, the second terminal is electrically connected to the first node, and the control terminal is electrically connected to a second node;
   a third transistor, comprising a first terminal receiving a second voltage and a second terminal electrically connected the second node; and
   a photodiode, comprising an anode and a cathode, wherein the anode is electrically connected to a third voltage and the cathode is electrically connected to the second node.

10. The sensing device as defined in claim 9, wherein during a first period, the first switch and the third switch are turned on, and the first capacitor and the second capacitor are charged.

11. The sensing device as defined in claim 10, wherein during a second period that follows the first period, only one of the second switch and the fourth switch is turned on.

12. The sensing device as defined in claim 11, wherein during a second period that follows the first period, at least part of the charge of one of the first capacitors and the second capacitor is distributed to generate an output signal.

13. The sensing device as defined in claim 12, wherein during a third period that after the second period, the first switch, the second switch, the third switch, and the fourth switch are turned on, and a voltages of the output node is reset to the reference voltage.

14. The sensing device as defined in claim 12, further comprising:

a first current source, electrically connected to a first data line between the first pixel circuit and the first switch, and generating a first fixed current; and a second current source, electrically connected to a second data line between the second pixel circuit and the third switch, and generating a second fixed current.

15. The sensing device as defined in claim 14, wherein the second current source further comprises:

a current switch, electrically connected to the first data line; and a resistor, electrically connected between the current switch and a reference voltage.

16. The sensing device as defined in claim 15, wherein the current switch of the second current source is controlled by a readout signal.

17. The sensing device as defined in claim 15, wherein the current switch of the second current source and the third switch are turned on and turned off simultaneously.

* * * * *